(12) United States Patent
Fukuda

(10) Patent No.: US 7,769,867 B2
(45) Date of Patent: Aug. 3, 2010

(54) MOUNTABLE MEMORY CARD AND METHOD FOR COMMUNICATING, CONTROLLING, ACCESSING AND/OR USING THE SAME

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 945 days.

(21) Appl. No.: 11/206,322

(22) Filed: Aug. 17, 2005

(65) Prior Publication Data

US 2006/0039221 A1 Feb. 23, 2006

(30) Foreign Application Priority Data

Aug. 18, 2004 (JP) ............................ P2004-238378
Jan. 5, 2005 (JP) ............................ P2005-001005

(51) Int. Cl.
*G06F 15/16* (2006.01)
(52) U.S. Cl. ...................................... 709/227; 709/117
(58) Field of Classification Search ......... 709/217–219, 709/227–229
See application file for complete search history.

(56) References Cited

U.S. PATENT DOCUMENTS

| | | | |
|---|---|---|---|
| 6,021,951 A * | 2/2000 | Nishikawa | 235/494 |
| 6,286,060 B1 * | 9/2001 | DiGiorgio et al. | 710/31 |
| 6,405,278 B1 | 6/2002 | Liepe | |
| 6,636,259 B1 * | 10/2003 | Anderson et al. | 348/211.3 |
| 2002/0158970 A1 * | 10/2002 | Takeshi | 348/211.3 |
| 2003/0208554 A1 * | 11/2003 | Holder | 709/217 |
| 2004/0125490 A1 * | 7/2004 | Fujiki et al. | 360/75 |
| 2004/0198446 A1 * | 10/2004 | Liu et al. | 455/558 |
| 2004/0266480 A1 * | 12/2004 | Hjelt et al. | 455/558 |
| 2005/0001024 A1 * | 1/2005 | Kusaka et al. | 235/375 |
| 2005/0086389 A1 * | 4/2005 | Chang | 709/250 |
| 2005/0246325 A1 * | 11/2005 | Pettinati et al. | 707/3 |

(Continued)

FOREIGN PATENT DOCUMENTS

EP 1 001 348 5/2000

(Continued)

OTHER PUBLICATIONS

Sorrels, Pete; "AN680: Passive RFID Basics"; Microchip Technologies; © 1998.*

*Primary Examiner*—Benjamin R Bruckart
*Assistant Examiner*—Alicia Baturay
(74) *Attorney, Agent, or Firm*—Lerner, David, Littenberg, Krumholz & Mentlik, LLP

(57) ABSTRACT

A communication system in which data stored in a memory card mounted in a host apparatus, such as a digital camera, can be sent to an external apparatus with ease without relying on operations carried out on the host apparatus. The memory card includes a communication control section controllable by the external apparatus so that data can be read out from a memory of the memory card and sent to the external apparatus in accordance with control executed by the external apparatus. Even if the host apparatus is a mobile apparatus such as a digital camera, picture data stored by the digital camera in the memory card can be sent to the external apparatus by wireless communication without the need to change the digital camera serving as the mobile apparatus specially by, for example, installing driver software. That is to say, the memory card can be applied to contemporary digital cameras.

15 Claims, 17 Drawing Sheets

U.S. PATENT DOCUMENTS

| | | |
|---|---|---|
| 2006/0046774 A1 | 3/2006 | Fukuda |
| 2006/0056326 A1 * | 3/2006 | Croome .................. 370/315 |
| 2007/0024444 A1 | 2/2007 | Fukuda |

FOREIGN PATENT DOCUMENTS

| | | |
|---|---|---|
| EP | 1 619 609 | 1/2006 |
| EP | 1 646 155 A1 | 4/2006 |
| FR | 2870365 A3 * | 11/2005 |
| JP | 01-182782 | 7/1989 |
| JP | 2001-077878 A | 3/2001 |
| JP | 2005-136943 | 5/2005 |
| WO | WO-03/088021 | 10/2003 |

* cited by examiner

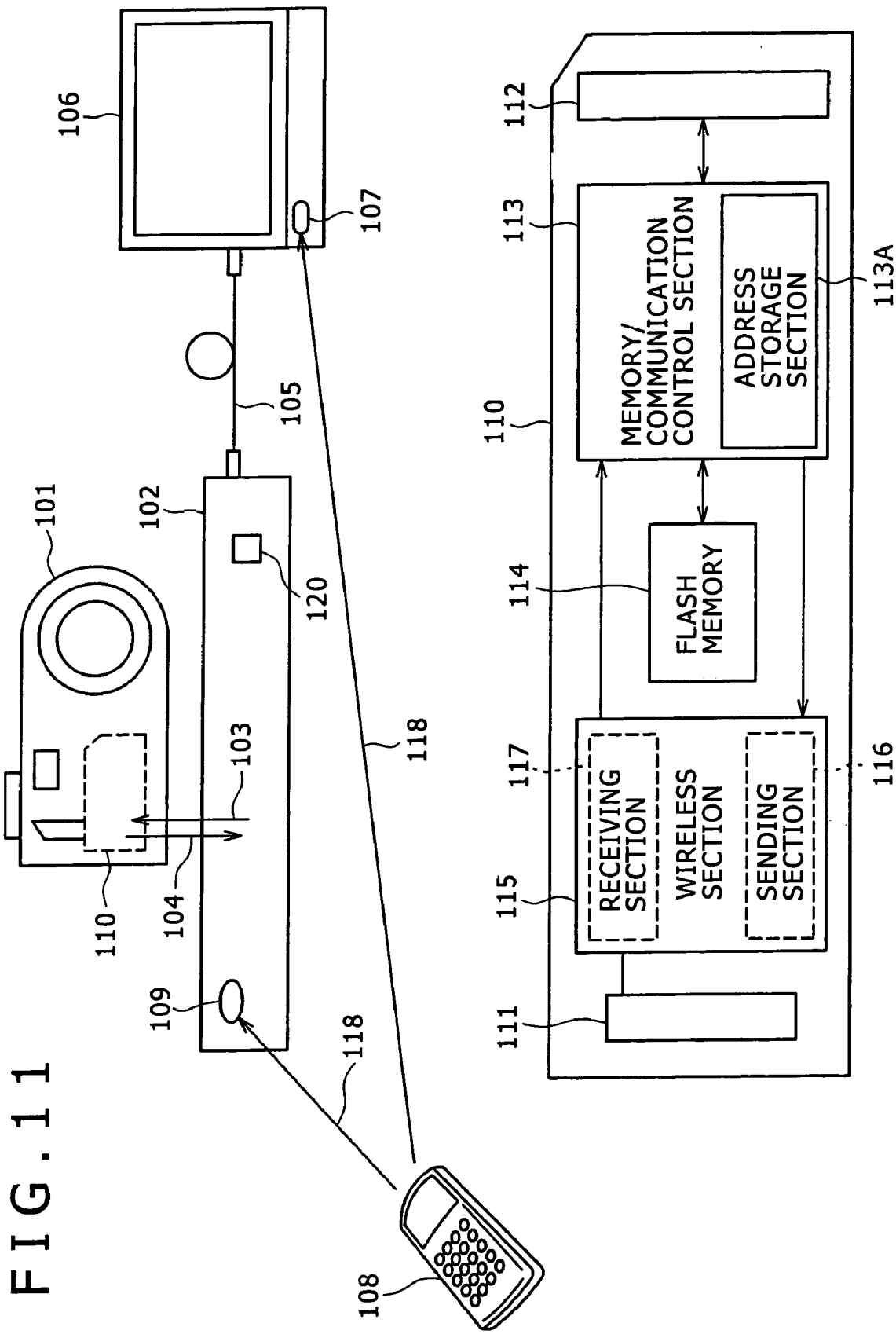

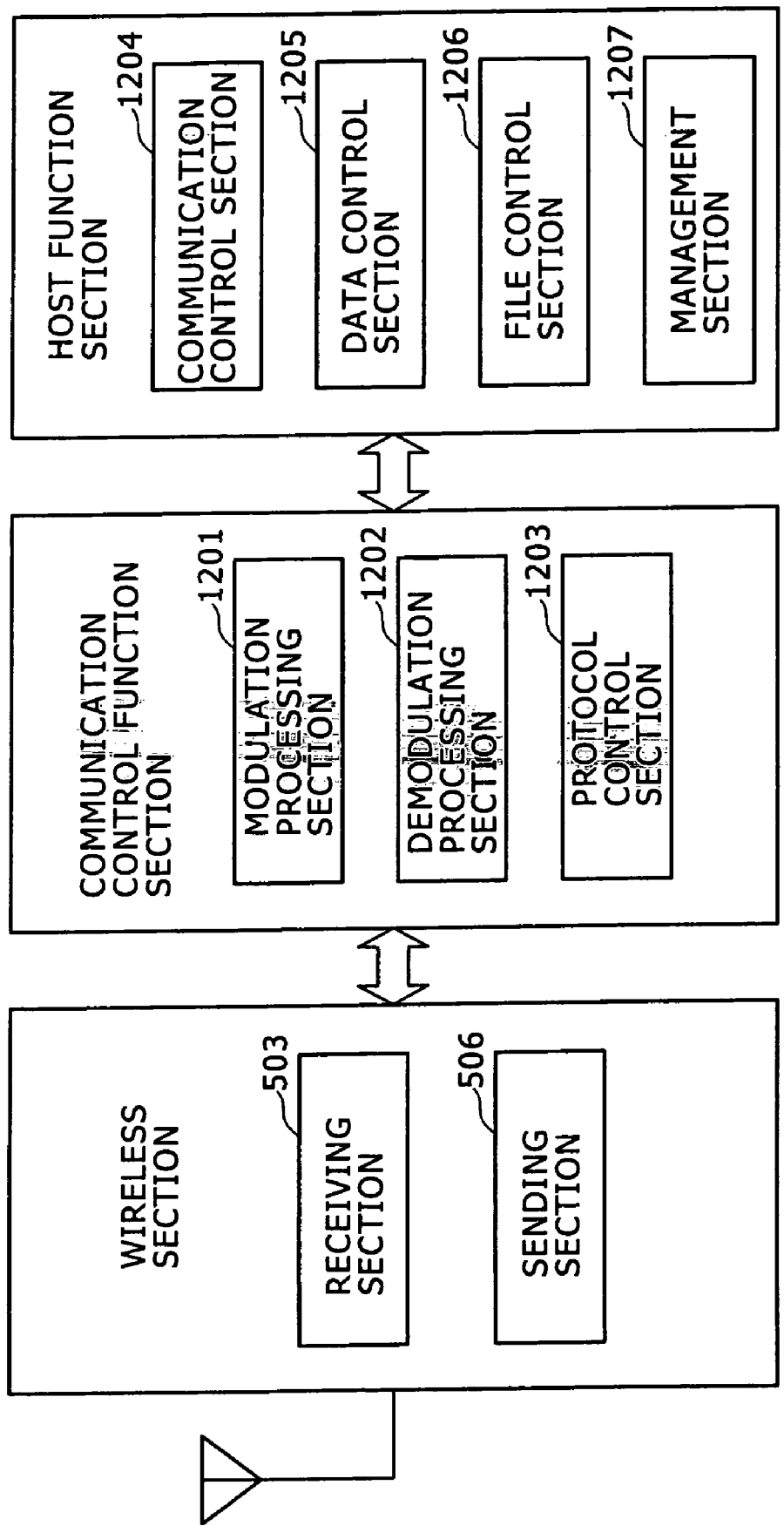

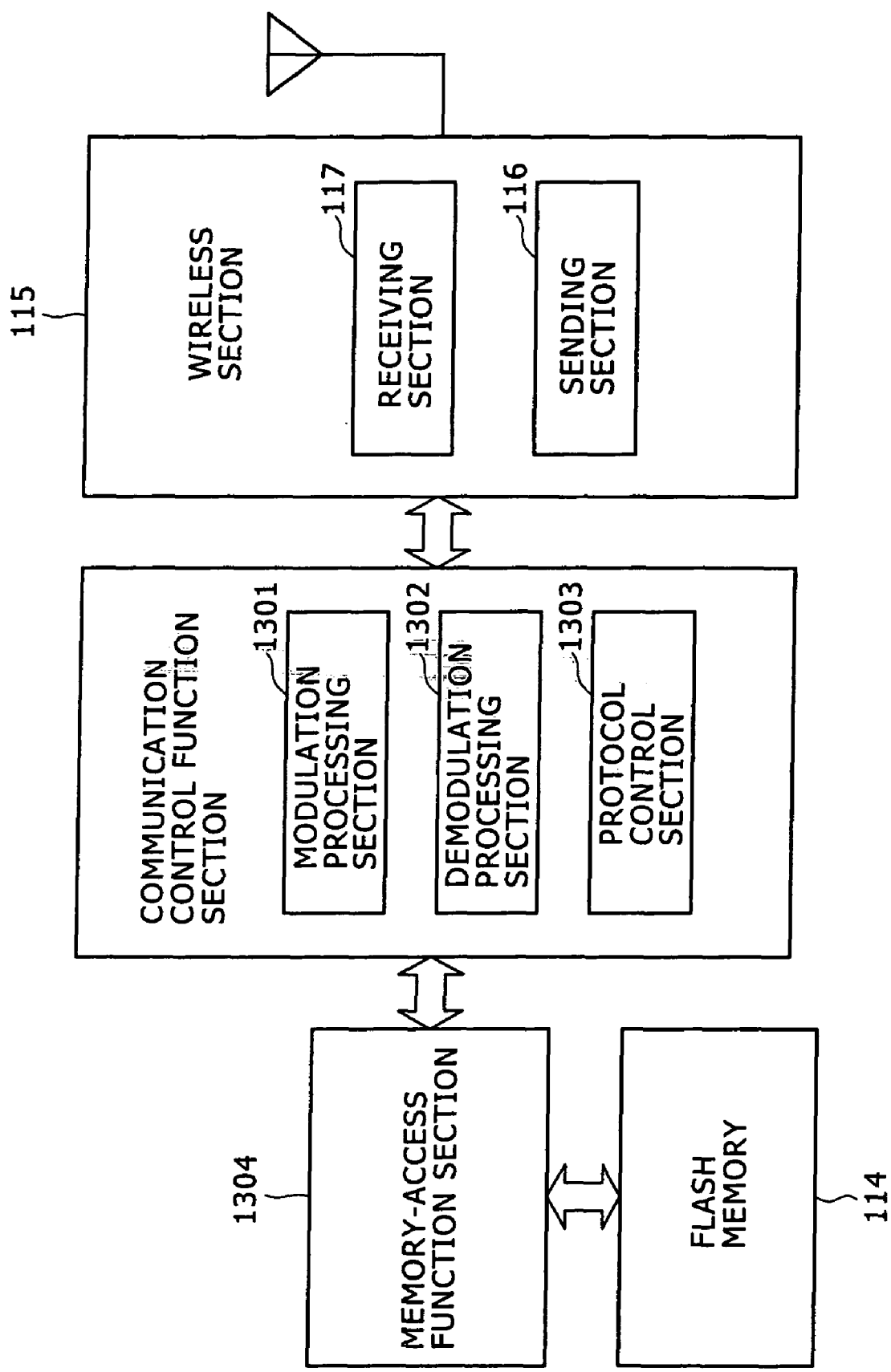

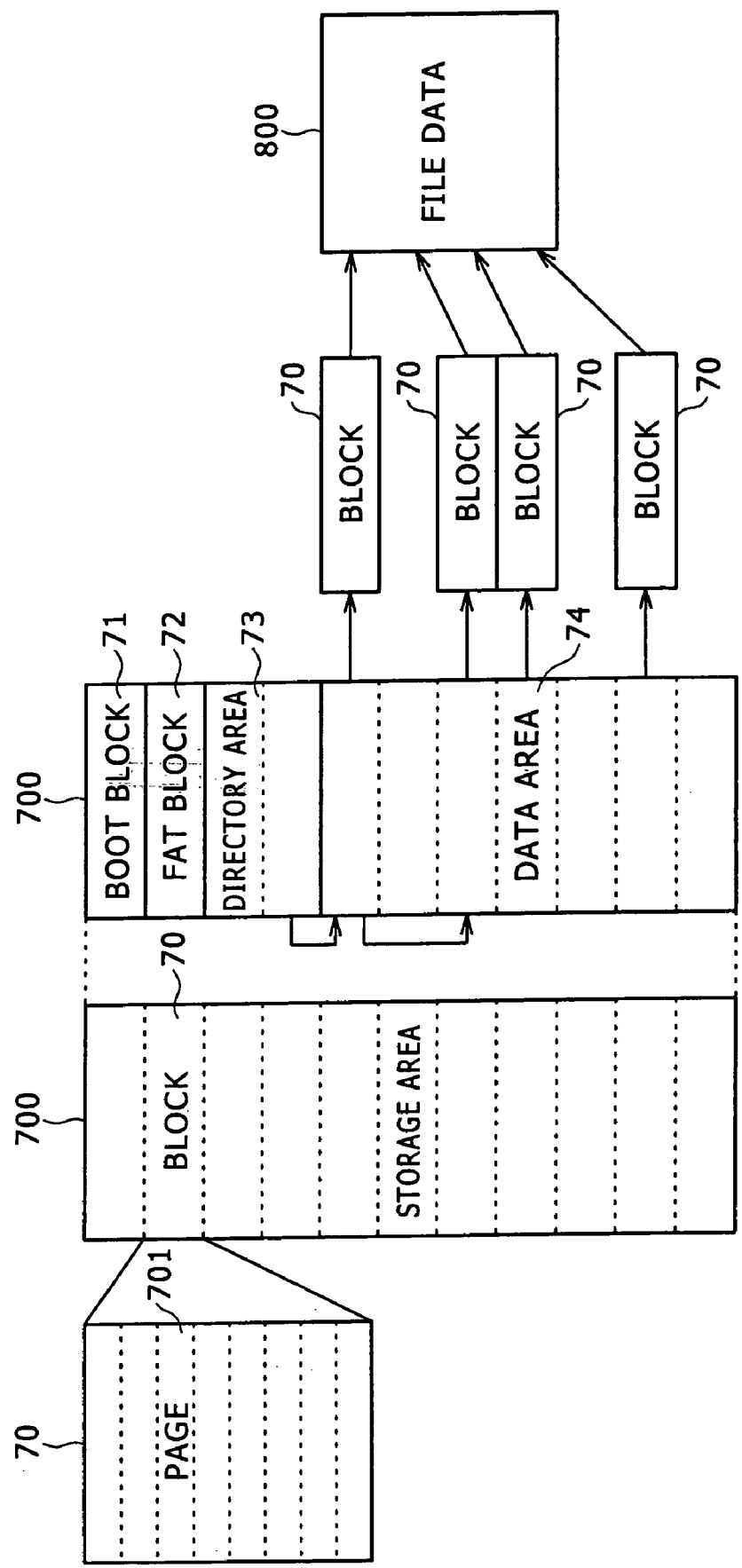

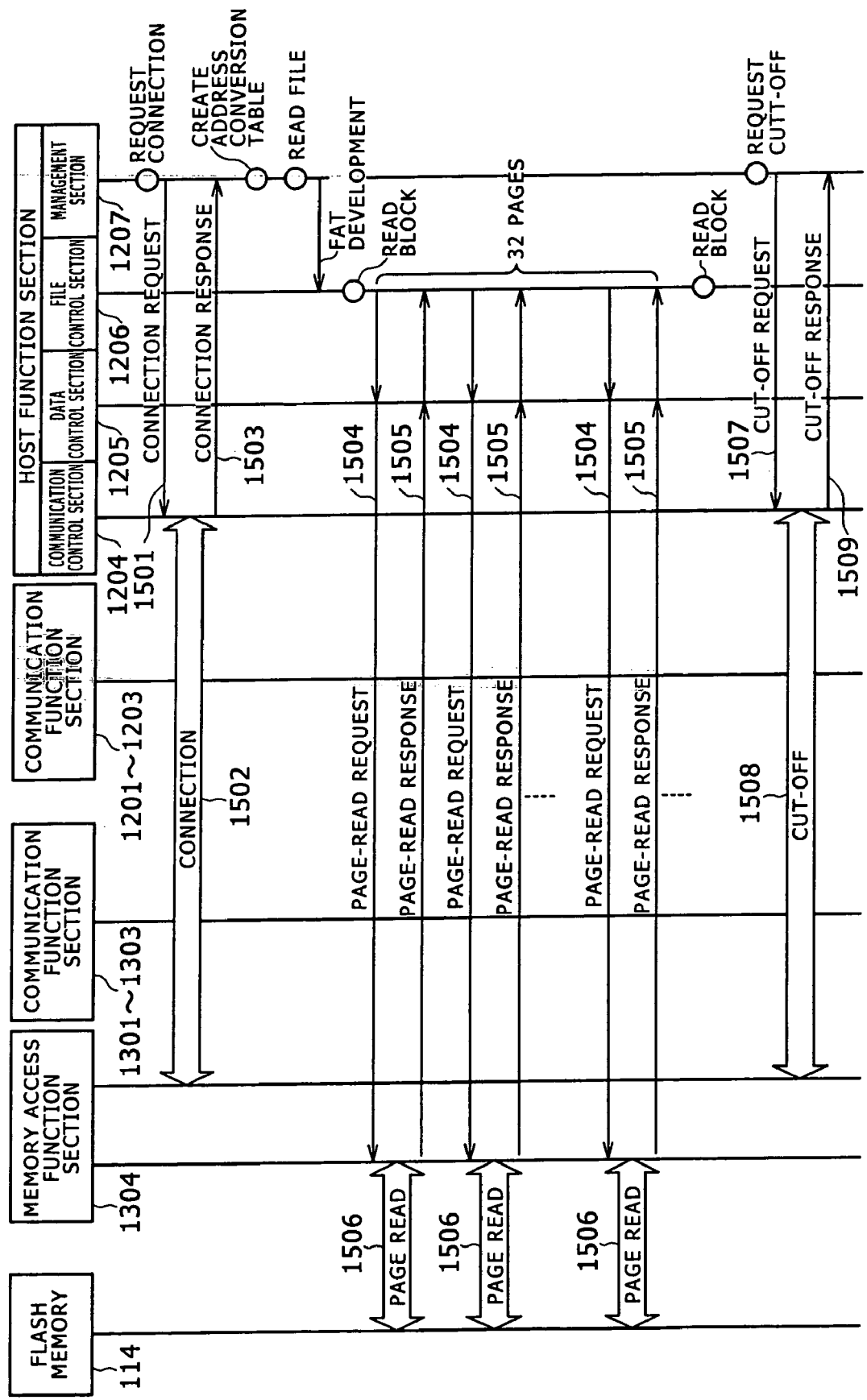

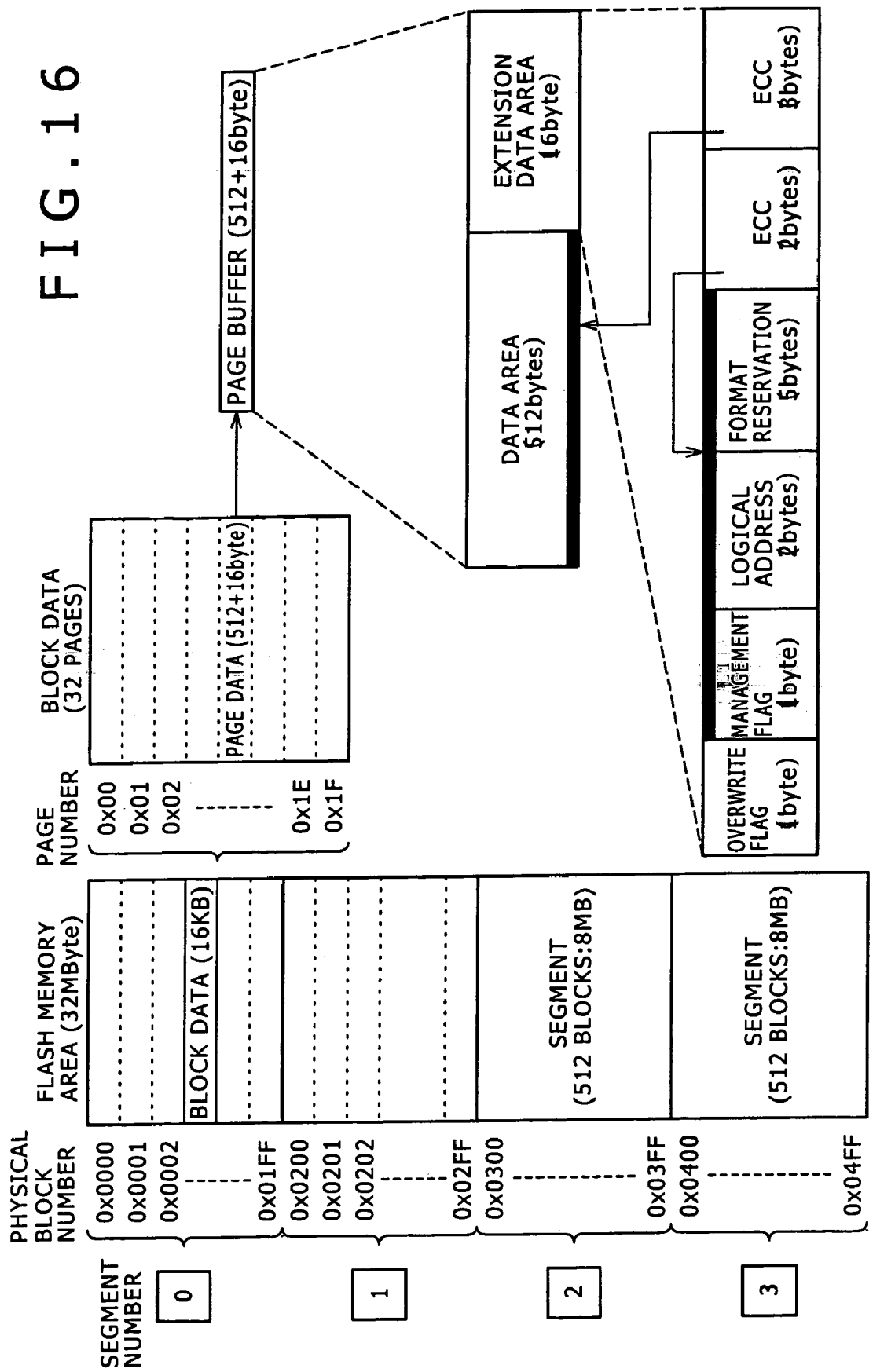

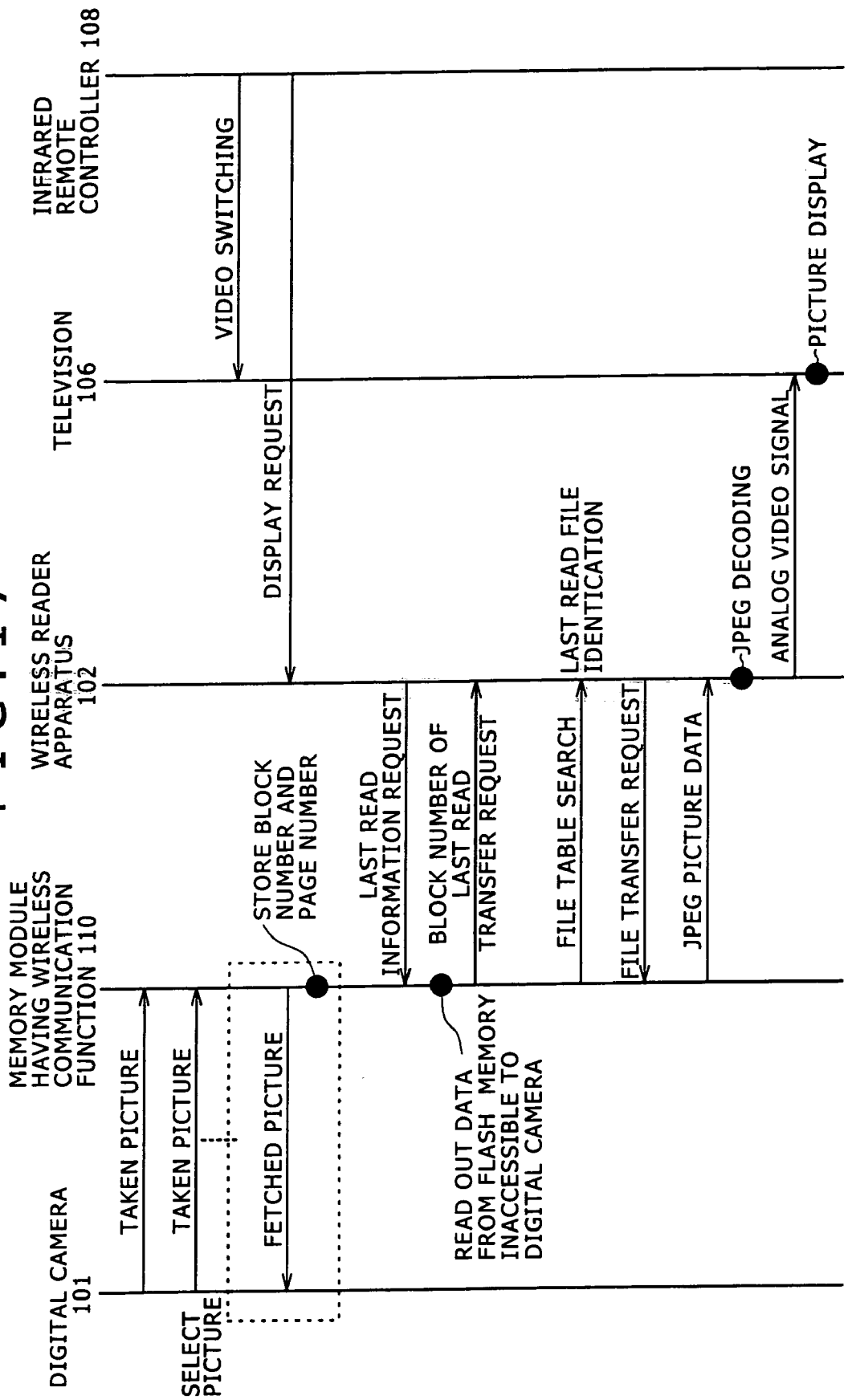

MOUNTABLE MEMORY CARD AND METHOD FOR COMMUNICATING, CONTROLLING, ACCESSING AND/OR USING THE SAME

CROSS-REFERENCE TO RELATED APPLICATIONS

The present application claims priority from Japanese Application Nos. 2004-238378 filed Aug. 18, 2004 and 2005-001005 filed Jan. 5, 2005, the disclosures of which are hereby incorporated by reference herein.

BACKGROUND OF THE INVENTION

The present invention relates to a memory card freely mountable onto an information apparatus to be used in the apparatus and freely dismountable from the information apparatus as well as relates to a control method of the memory card, a method of controlling accesses to the memory card and computer programs implementing the methods. More particularly, the present invention relates to a memory card including a wireless communication function used for sending data stored in a memory of the memory card by wireless communication to an external wireless apparatus as well as relates to a control method of the memory card, a method of controlling accesses to the memory card and computer programs implementing the methods.

To put it in detail, the present invention relates to a memory card capable of sending data stored in a memory of the memory card with ease to an external wireless apparatus by wireless communications without relying on operations carried out on a host apparatus in which the memory card has been mounted as well as relates to a control method of the memory card, a method of controlling accesses to the memory card and computer programs implementing the methods. More particularly, the present invention relates to a memory card capable of sending data from a memory of the memory card to an external wireless apparatus by wireless communications without requiring driver software to be installed in a host apparatus in which the memory card has been mounted as software for controlling the wireless communications as well as relates to a control method of the memory card, a method of controlling accesses to the memory card and computer programs implementing the methods.

Accompanying the present technological revolution, a variety of information apparatus each used for handling computer files for storing various kinds of information such as texts, images and sounds has been developed and sold in the market. The information apparatus include a PC (Personal Computer), a PDA (Personal Digital Assistant), a digital camera and a portable media player. Most of the information apparatus have an interface such as a card slot and a connector, which are used as a mounting unit of a cartridge-type memory device such as a memory card and a USB memory. The card slot and the connector allow the cartridge-type memory to be mounted on and dismounted from the information apparatus with a high degree of freedom. A plurality of examples of the memory card includes a Memory Stick (Registered Trademark of Sony Corporation) and an SD (Secure Digital) card. These typical memory cards conform to different specifications. In the following description, a memory card is a memory device that can be mounted on and dismounted from an information apparatus.

In the case of a digital camera, for example, an image taken by the digital camera is encoded into a predetermined file format such as the JPEG (Joint Picture Experts Group) or MPEG (Moving Picture Experts Group) format before being saved in a memory card mounted on the digital camera. In this way, the memory card can be used for storing a large number of pictures that cannot all be stored in a memory embedded in an information apparatus such as the digital camera as a memory having a relatively small storage capacity. In addition, as the memory card becomes full of data stored therein, the memory card can be replaced with another memory card having a storage capacity for newly accommodating additional taken pictures.

On top of that, a picture file generated by a digital camera can be transferred to another information apparatus such as a personal computer. The other information apparatus is capable of carrying out image processing such as adjustment of the picture quality and picture re-encoding. In addition, the information apparatus is also capable of executing management of pictures by storing the pictures in a database or an album. The information apparatus is also capable of transferring a picture to a television receiver for displaying the picture on a large screen to the user. The information apparatus is also capable of transferring a picture to a printer for printing the picture as a photo to be enjoyed by the user.

In accordance with a method of using a memory card for transferring an image or other data from a specific information apparatus to another, generally, the memory card is pulled out from the specific information apparatus and then mounted on the other information apparatus. As an alternative, a host apparatus having a memory card mounted thereon and an information apparatus serving as a transfer destination of data are capable of carrying out a communication of the data through a wire or wireless communication line by using wire or wireless interfaces. If the latter wireless communication is selected among other methods as a technique for transmission data, it is not necessary to provide connectors on the apparatus and connect the connectors by a cable. That is to say, the latter wireless communication is convenient.

FIG. 9 is a diagram showing an example of an image transmission by wireless communication. It is assumed that a digital camera is used as a mobile apparatus in the typical image transmission shown in the figure. The digital camera stores an image taken thereby as image data in a memory embedded therein or an external memory card. Later on, the digital camera reads out desired image data from the embedded memory or the external memory card and sends the image data to an image reproduction apparatus such as a PC, a television set or a printer by way of a wireless interface. Of course, the image reproduction apparatus such as a PC, a television set or a printer also has a wireless interface module as an adopter. Then, the PC stores and displays the image data, the television set shows the image data on its screen or the printer prints out the image data on a piece of paper.

In order to send data by wireless communication as shown in the figure, the digital camera serving as the sender of data must have a wireless interface module. If the data sender is an apparatus that does not include an embedded wireless interface module, it is necessary to provide the data sender with an external wireless interface module such as an externally attached adapter. Examples of a wireless communication function used in the data transmission include wireless LANs based on the Blue tooth communication and the IEEE 802.11.

For example, external memory media including an embedded wireless communication function has been proposed in a document such as Japanese Patent Laid-open No. 2001-77878. The external memory media includes a wire communication section for exchanging data by way of a physical connection section such as a connector with a host apparatus on which the external memory media is mounted. In addition, the external memory media includes a short-distance wireless-communication section for exchanging data with an external communication network by way of a short-distance wireless-communication network such as the Blue tooth communication. Thus, the host apparatus such as the digital camera serving as the data sender has such external memory media mounted thereon and drives the short-distance wireless-communication section employed in the external memory media to allow data to be exchanged with an external communication network.

FIG. 10 is a diagram showing a typical configuration of a memory card having a wireless communication function. In the figure, reference numeral 10 denotes the memory card having a wireless communication function and reference numeral 11 denotes a host apparatus such as a digital camera. Reference numeral 2 denotes an external apparatus such as a printer serving as a data transmission destination or a television monitor serving as a data output destination.

The wireless-communication-function-including memory card 10 has a flash memory 6 for executing the basic function of a memory card, a memory control section 7 and an interface section 8 serving as an interface with the host apparatus 11. In addition, the wireless-communication-function-including memory card 10 also includes a wireless section 4 for carrying out typically the Blue tooth communication and a communication control section 5. The communication control section 5 is a unit for controlling a communication protocol of the wireless communication. Reference numeral 3 denotes an antenna employed in the wireless-communication-function-including memory card 10 as a counterpart of an antenna 9 employed in the external apparatus 2.

Normally, the host apparatus 11 makes accesses to the flash memory 6 through the interface section 8 and the memory control section 7 in order to store data in the flash memory 6 and read out data from the flash memory 6. In an operation to send a desired image stored in the flash memory 6 to the external apparatus 2 serving as a data transfer destination, the host apparatus 11 reads out the image from the flash memory 6 through the interface section 8 and the memory control section 7. Then, the host apparatus 11 sends the image to the external apparatus 2 by wireless communication by way of the interface section 8, the communication control section 5, the wireless section 4 and the antenna 3.

In order to send data from the wireless-communication-function-including memory card 10 to the external apparatus 2 by wireless communication as described above, it is necessary to control a wireless communication function conforming to a predetermined communication protocol such as the Blue tooth communication or the communication based on the IEEE 802.11. It is thus necessary to install driver software in the host apparatus including a wireless interface module as software for driving a wireless communication function of the wireless interface module in accordance with the protocol. In the typical configuration shown in FIG. 10, the wireless interface module is the wireless-communication-function-including memory card 10 and the wireless communication function of the wireless interface module is the communication control section 5. Thus, in the typical configuration shown in FIG. 10, it is necessary to install driver software for controlling the communication control section 5. Such an operation to install such driver software is work cumbersome to the user.

In addition, in the case of a digital camera and another portable apparatus or an apparatus of a built-in type, the driver software itself cannot probably be executed. In this case, even if external memory media such as the memory card having an embedded wireless communication function described above is used in conjunction with the digital camera and the other portable apparatus or the apparatus of a built-in type, the wireless communication function cannot be carried out. As a result, in order to transfer data stored in the memory card to another apparatus, it is necessary to adopt the conventional method by which the memory card is taken to the other apparatus or the data is sent to the other apparatus through a wire connection.

In addition, operations to select a file to be sent and other operations related the communication processing must be carried out by operating a user interface of the digital camera or the other apparatus and the operations themselves are cumbersome.

SUMMARY OF THE INVENTION

It is thus an object of the present invention, which addresses the problems described above, to provide an excellent memory card usable with an information apparatus, freely mountable on the apparatus and freely dismountable from the apparatus, as well as a method for controlling the memory card, a method for controlling accesses to the memory card and computer programs implementing the control methods.

It is another object of the present invention to provide an excellent memory card having a wireless communication function for sending data stored in a memory of the card by wireless communication to an external apparatus, as well as a method for controlling the memory card, a method for controlling accesses to the memory card and computer programs implementing the control methods.

It is a further object of the present invention to provide an excellent memory card capable of sending data stored in a memory of the card by wireless communication to an external apparatus with ease without relying on an operation carried out on a host apparatus on which the card has been mounted, as well as a method for controlling the memory card, a method for controlling accesses to the memory card and computer programs implementing the control methods.

It is a still further object of the present invention to provide an excellent memory card capable of sending data stored in a memory of the card by wireless communication to an external apparatus without the need of installing driver software in a host apparatus on which the card has been mounted, as well as a method for controlling the memory card, a method for controlling accesses to the memory card and computer programs implementing the control methods.

In order to solve the problems described above, according to one embodiment of the present invention, there is provided a memory card to be used by mounting the card onto an external apparatus. The memory card includes a memory for storing data; wire communication means freely mountable onto the external apparatus and freely dismountable from the external apparatus; wireless communication means for carrying out communication operations with an external wireless apparatus through a wireless transmission line; and memory/communication control means for controlling operations to access the memory by way of the wire communication means and the wireless communication means and for controlling wireless communication operations carried out by the wireless communication means.

In the memory card, the wireless communication means carries out communication operations to send data read out from the memory through the wireless transmission line to the external wireless apparatus independently of the external apparatus connected to the wire communication means.

A large number of information apparatus have a connector or interface serving as a component, onto and from which a cartridge-type memory device, such as a memory card, a Memory Stick (Registered Trademark of Sony Corporation) or a USB memory, can be mounted and dismounted with a high degree of freedom. By providing the memory card of this type with short-distance wireless communication means, however, it is not necessary to provide connectors on the apparatus and connect the connectors by a cable every time data is sent so that the degree of convenience is raised. It is necessary, nevertheless, to install driver software in the information apparatus including a wireless interface module such as the cartridge-type memory device as software for driving a wireless communication function of the wireless interface module in accordance with a protocol, and an operation to install such driver software is work cumbersome to the user.

In the memory card according to an embodiment of the present invention, on the other hand, the memory/communication control means controls operations to access the memory by way of the wire communication means and the wireless communication means as well as controls wireless communication operations carried out by the wireless communication means as described above. In addition, the wireless communication means is capable of sending data read out from the memory to an external wireless apparatus by way of a wireless communication line without relying on the external apparatus connected to the wire connection means. That is to say, the memory/communication control means is capable of controlling wireless communication operations carried out by the wireless communication means to send data read out from the memory to the external wireless apparatus independently of the external apparatus. Thus, the external wireless apparatus is capable of accessing the memory by wireless communication without installing driver software in the external apparatus in which the memory card has been mounted.

The memory/communication control means receives power from the external apparatus in which the memory card has been mounted by way of the wire communication means. Thus, the memory card is capable of carrying out wireless communication operations without a power supply embedded in the memory card.

The memory/communication control means controls operations to access the memory in accordance with the state of connection of the wire communication means. That is to say, in order to avoid contentions among accesses made by the wireless communication means and the wire communication means as accesses to the memory, the memory/communication control means allows only one access to the memory to be made at one time in an operation carried out by either the wire communication means or the wireless communication means. To put it concretely, while the wireless communication means is carrying out a wireless communication operation to access the memory, the memory/communication control means prohibits an access made by the wire communication means as an access to the memory. In this way, it is possible to avoid an incorrect operation due to a contention of accesses made simultaneously by both the wireless communication means and the wire communication means as accesses to the memory. At the same time, it is possible to guarantee a smooth request made by the wireless communication means as a request for an access to the memory. Of course, while the wire communication means is transferring data between the memory and the external apparatus, the memory/communication control means prohibits an access made by the wireless communication means as an access to the memory.

Unlike a communication operation carried out by the wire communication means, it is feared that a wireless communication operation carried out by the wireless communication means may be interrupted in the course of the communication being processed. In this case, data stored in the memory may be destroyed. In order to prevent data stored in the memory from being destroyed inadvertently, it is possible to provide a configuration in which the wireless communication means is allowed to request an operation to read out data from the memory, but not to request an operation to write data into the memory.

The memory can be used for storing more than one file. When an external wireless apparatus requests a file stored in the memory or requests information on files stored in the memory through the wireless communication means, in response to such a request, the memory/communication control means sends the requested file or the requested information on the files to the external wireless apparatus by way of the wireless communication means. The external wireless apparatus making the request receives the requested information on the files stored in the memory, is capable of displaying a list of files on the basis of the information on the files and allows the user of the apparatus to select a desired one of the files. Then, the external wireless apparatus makes another request for the selected file.

In addition, the memory card according to the embodiment of the present invention can be used by connecting the card to an image pick-up apparatus, such as a digital camera, which is used for taking a picture, through the wire communication means. For example, the memory card may be inserted into a memory slot provided in the digital camera. In such a case, image data generated by the digital camera serving as an image pick-up apparatus is stored in the memory by way of the wire communication means in accordance with control executed by the memory/communication control means. When a request for a desired image data stored in the memory is received from a host apparatus connected to the wire communication means, on the other hand, in response to the request, data of the image is read out from the memory and transferred to the apparatus making the request by way of the wireless communication means. In this way, the memory card is capable of performing pull distribution of image data to an apparatus making a request for image data.

In addition, it is also possible to provide a configuration in which the wireless communication means carries out a back scatter communication of outputting a reflected-wave signal modulated in accordance with data being sent as a reflected wave of a received wave in the so-called reflected-wave signal transmission system. The reflected-wave signal transmission system is capable of modulating a reflected wave by merely carrying out a switching operation to change the load impedance of an antenna of the memory card or to provide a phase difference to a reflected-wave signal line. Thus, it is possible to implement a data transmission line with a small power consumption in comparison with other wireless communication systems.

In addition, according to one embodiment of the present invention, there is provided a memory card to be used by mounting the card onto an external apparatus. The memory card includes a memory for storing data; wire communication means freely mountable onto the external apparatus and freely dismountable from the external apparatus; wireless communication means for carrying out communication operations with an external wireless apparatus through a wireless transmission line; memory/communication control means for controlling operations to access the memory by way of the wire communication means and the wireless communication means and for controlling wireless communication operations carried out by the wireless communication means; and address storage means for storing an address in the memory indicating a location most recently accessed through the wire communication means.

In response to a request received from the external wireless apparatus through the wireless communication means for an address indicating a most recently accessed location in the memory, the memory/communication control means is capable of sending the address to the external wireless apparatus.

In addition, the wireless communication means is capable of carrying out an operation to send data read out from the memory to the external wireless apparatus through a wireless communication line without relying on the external apparatus connected to the wire communication means. The wireless communication means also sends a reflected wave signal modulated on the basis of data being sent as a reflected wave of an incoming wave.

In addition, according to one embodiment of the present invention, there is provided a memory card to be used by mounting the card onto an external apparatus. The memory card includes a memory for storing data; wire communication means freely mountable onto the external apparatus and freely dismountable from the external apparatus; memory/communication control means for controlling operations to access the memory by way of the wire communication means; and address storage means for storing an address in the memory indicating a location most recently accessed through the wire communication means.

In response to a request received from the external apparatus connected to the wire communication means for an address indicating a most recently accessed location in the memory, the memory/communication control means is capable of sending the address to the external apparatus by way of the wire communication means.

The present invention assumes a data communication system allowing data to be exchanged between a memory card and a wireless information apparatus by way of wireless communication means employed in the memory card and between the memory card and an external information apparatus by way of wire communication means also employed in the memory card. In an operation to exchange data between two apparatus, that is, an operation to send data from a sending apparatus serving as a data sender to a receiving apparatus serving as a data receiver, in general, the data sender specifies a file containing the data to be sent to the data receiver before actually sending the file to the data receiver. When an image pick-up apparatus such as a digital camera sends a taken picture to a PC, for example, the image pick-up apparatus is first of all connected to the PC and then the apparatus specifies a file of the taken picture to be sent before carrying out an operation to send the file to the PC. The image pick-up apparatus may be connected to the PC by a reflected-wave transmission line described earlier. In this case, it is necessary to carry out an operation to adjust directivity from the image pick-up apparatus toward the PC in addition to the operation to specify the file to be sent from the image pick-up apparatus to the PC.

In such a case, however, the user must connect the image pick-up apparatus to an image-displaying apparatus such as the PC every time a file is sent from the image pick-up apparatus to the image-displaying apparatus, and the work to connect the image pick-up apparatus to an image-displaying apparatus is a cumbersome job that must be done by the user. To put it concretely, when data is sent through the wireless communication means by reflected-wave transmission, the user must specify the file of the data to be sent and adjust the directivity of the image pick-up apparatus toward the image-displaying apparatus, bearing a cumbersome workload.

In the case of the memory cards according to one embodiment of the present invention, on the other hand, a most recently accessed address used for indicating a location in the memory can be assumed to be an address for storing a file the user wants to view most eagerly. This is because the user has a habit of verifying the file the user wants to view most eagerly by previewing the file prior to transmission of the file. In other cases, the data to be transferred is specified by making a last access to a file containing the data the user wants to view most in a data transfer operation.

In such a case, an information apparatus or external apparatus serving as a data transfer destination acquires an address from the address storage means described before. Then, on the basis of the acquired address, the data transfer destination apparatus identifies a last accessed file assumed to contain desired data, and requests the memory card to send the file through communication means.

In addition, according to one embodiment of the present invention, there is provided an access control method for allowing a file to be transferred from the memory employed in the memory card according to one embodiment of the present invention to an apparatus external to the memory card with ease without relying on operations carried out by the user to select the file or specify the name of the file. The access control method includes acquiring an address from the address storage means employed in the memory card; identifying a most recently accessed file on the basis of the acquired address; and requesting the memory card through communication means employed in the memory card to send data composing the identified file to the apparatus external to the memory card.

The access control method allows an access to the memory card to be made through the communication means employed in the memory card as the wireless communication means such as a reflected-wave transmission line or the wire communication means.

In addition, according to one embodiment of the present invention, there is provided a recording medium recorded with a computer program written in a format readable by a computer for executing an access control method for controlling accesses to a memory card having a memory for storing data and accessible from an external apparatus through communication means, and address storage means for storing an address indicating a most recently accessed location in the memory. The access control method includes acquiring an address from the address storage means in the memory card; identifying a most recently accessed file on the basis of the acquired address; and requesting the memory card through the communication means to send data composing the identified file to the external apparatus.

The computer program according to one embodiment of the present invention is a program defining predetermined processing, which is to be carried out by a computer system, in a descriptive format readable by a computer employed in the computer system. In other words, by installing the computer program in the computer system, the computer system is capable of demonstrating a collaborative function and exhibiting the same effect as the access control method provided for the memory card in accordance with one embodiment of the present invention.

In accordance with the present invention, it is possible to provide an excellent memory card which has a wireless communication function and is capable of sending data stored in a memory of the card by wireless communication to an external apparatus, as well as a method for controlling the memory card, a method for controlling accesses to the memory card and computer programs implementing the control methods.

In addition, in accordance with the present invention, it is possible to provide an excellent memory card capable of sending data stored in a memory of the card to an external apparatus with ease without relying on an operation carried out on a host apparatus on which the card has been mounted, as well as a method for controlling the memory card, a method for controlling accesses to the memory card and computer programs implementing the control methods.

The memory card according to the embodiment of the present invention has a wireless communication function and memory/communication control means embedded in the memory card as means that can be controlled by an external wireless apparatus so that it is not necessary to install driver software for executing communication control in, for example, a digital camera serving as the host apparatus of the memory card. By providing the memory card with such a wireless communication function, the memory card is capable of exhibiting the following effects:

(1): It is possible to implement wireless transmission of image data which has been stored by a mobile apparatus, such as a digital camera, into the memory card, without specially modifying the mobile apparatus by, for example, installation of driver software or the like in the mobile apparatus. That is to say, the memory card can be applied to existing digital cameras.

(2): The manufacturer of the mobile apparatus does not have to develop a mobile apparatus including an embedded wireless communication function so that the time it takes to develop the mobile apparatus can be kept short.

In addition, as the wireless communication function embedded in the memory card, it is possible to adopt a reflected-wave transmission method for modulating and sending a reflected wave of an incoming wave so as to require only a small area for installing a module for implementing the function. In addition, by adopting such a reflected-wave transmission method, the amount of power consumed in a communication operation can be reduced substantially.

BRIEF DESCRIPTION OF THE DRAWINGS

These and other objects and features of the present invention will become clear from the following description of the preferred embodiments given with reference to the accompanying diagrams, in which:

FIG. 11 is a diagram showing the configuration of a model of a wireless transmission system according to a second embodiment of the present invention;

FIG. 12 is a diagram showing the functional configuration of a model of a communication control section employed in a wireless reader in the wireless transmission system shown in FIG. 11;

FIG. 13 is a diagram showing the functional configuration of a model of a memory/communication control section employed in wireless-communication-function-including memory media;

FIG. 14 is a diagram showing typical configurations of a physical storage area and physical data, which are included in a flash memory employed in wireless-communication-function-including memory media;

FIG. 15 is a diagram showing a sequence of processing carried out by a memory-access functional section employed in the wireless-communication-function-including memory media to make accesses to read out file data from the flash memory in block-data units at a request made by a host functional section employed in the wireless reader;

FIG. 16 is a diagram showing typical configurations of a physical and logical formats of the flash memory; and FIG. 17 is a diagram showing a sequence of control executed for transferring an image last seen in a digital camera in a playback operation.

DETAILED DESCRIPTION

Embodiments of the present invention are described in detail by referring to diagrams as follows.

Figure 1:
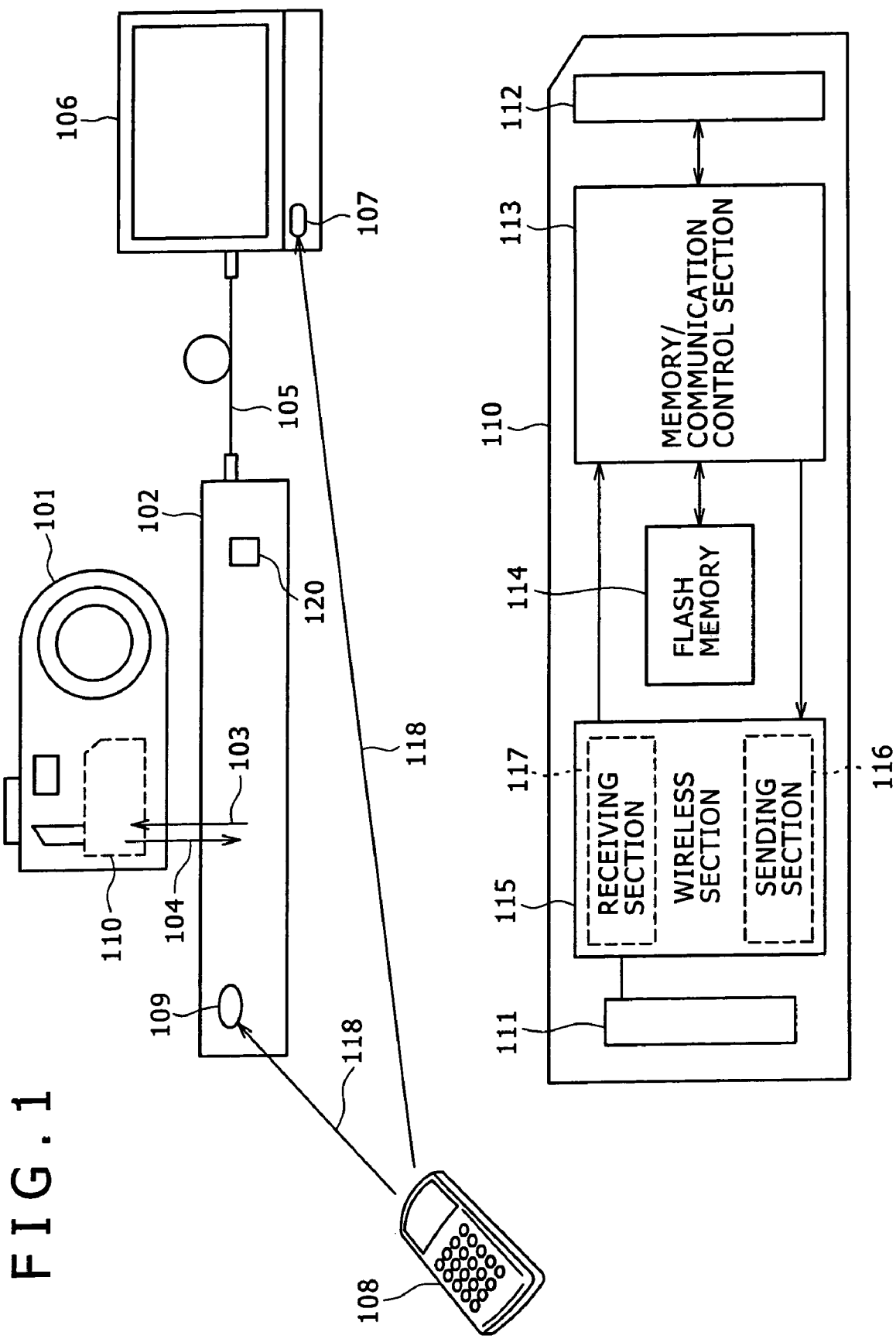
FIG. 1 is a diagram showing the configuration of a model of a wireless transmission system according to a first embodiment of the present invention.

FIG. 1 is a diagram showing the configuration of a model of a wireless transmission system according to a first embodiment of the present invention. As shown in the figure, the wireless transmission system includes a digital camera 101, a wireless-communication-function-including memory media 110, a wireless reader 102, a television set 106 and an infrared remote controller 108.

The wireless-communication-function-including memory media 110 is plugged into typically a special memory slot provided in the digital camera 101 but not shown in the figure. To put it in detail, a connector section 112 employed in the wireless-communication-function-including memory media 110 is inserted into the special memory slot. In this way, the connector section 112 and the special memory slot form a wire communication interface between the wireless-communication-function-including memory media 110 and the digital camera 101. Typically, the wire communication interface conforms to standard interface specifications such as memory-stick specifications, PC-card specifications or USB specifications.

The digital camera 101 is capable of making an access to a flash memory 114 of the wireless-communication-function-including memory media 110 through the connector section

112. Thus, the digital camera 101 is capable of storing a taken image into the flash memory 114 and reading out data of an image or the like from the flash memory 114. In addition, the wireless-communication-function-including memory media 110 receives a driving power from the digital camera 101 through the connector section 112.

On top of that, the wireless-communication-function-including memory media 110 has a wireless section 115 serving as a wireless communication interface between the wireless-communication-function-including memory media 110 and the wireless reader 102. The wireless section 115 includes a sending section 116 and a receiving section 117, which are used for carrying out wireless transmissions between the wireless-communication-function-including memory media 110 and the wireless reader 102. The wireless communication interface typically conforms to specifications such as the IEEE 802.11 standard serving as standard specifications of wireless LANs, Bluetooth communication specifications or specifications of reflected-wave transmission. The reflected-wave transmission is a transmission in which a back scatter communication is carried out as a communication of outputting a reflected-wave signal modulated in accordance with data being sent as a reflected wave of a received wave. Processing to modulate a reflected wave can be performed by merely carrying out only a switching operation to change the load impedance of the antenna or provide a phase difference to a reflected-wave signal line.

For example, the wireless reader apparatus 102 (200) sends a control signal 103 by wireless communication to the wireless-communication-function-including memory media 110. In response to this control signal 103, the wireless-communication-function-including memory media 110 mounted in the digital camera 101 sends a response signal 104 conveying JPEG image data also by wireless communication.

The wireless reader apparatus 102 has a display section 120 for displaying information such as an operating state of the wireless reader apparatus 102. For example, the display section 120 shows a state of receiving data sent from the wireless-communication-function-including memory media 110 in wireless communication to the user.

In addition, the wireless reader apparatus 102 is connected to an external video input terminal of the television set 106 through a video cable 105. Thus, the wireless reader apparatus 102 is capable of outputting a video signal conveying data of an image taken by the digital camera 101 and stored in the wireless-communication-function-including memory media 110 to the external video input terminal of the television set 106 through the video cable 105.

The television set 106 has an infrared-ray receiving section 107 and the wireless reader apparatus 102 has an infrared-ray receiving section 109. The infrared-ray receiving section 107 and the infrared-ray receiving section 109 are each used for receiving an infrared ray conveying a control command from the infrared remote controller 108. The television set 106 and the wireless reader apparatus 102 each carry out an operation according to a control command conveyed in the received infrared ray. The infrared remote controller 108 sends an infrared ray as a control signal 118 conveying the control command to the infrared-ray receiving section 109 employed in the wireless reader apparatus 102 and the infrared-ray receiving section 107 employed in the television set 106. Commands given by the infrared remote controller 108 to the television set 106 include control commands such as a command to change the channel of the video display and general operation commands such as a command to adjust the volume of a sound generated by the television set 106. On the other hand, control commands given by the infrared remote controller 108 to the wireless reader apparatus 102 include a command to control a wireless communication operation carried out by the wireless reader apparatus 102 and a command to make an access to the wireless-communication-function-including memory media 110 inside the digital camera 101 through the wireless reader apparatus 102.

For example, the user is capable of operating the infrared remote controller 108 to request the wireless reader apparatus 102 to output image data acquired from the wireless-communication-function-including memory media 110 mounted on the digital camera 101 to the television set 106 through the video cable 105 and capable of requesting the television set 106 to display the image data received from the wireless reader apparatus 102 through the video cable 105 on the screen of the television set 106.

Next, the internal configuration of the wireless-communication-function-including memory media 110 is described in detail as follows. As shown in FIG. 1, the wireless-communication-function-including memory media 110 includes an antenna 111, a wireless section 115, a flash memory 114, a memory/communication control section 113 and the connector section 112 mentioned before.

The flash memory 114 is an electrically erasable and programmable non-volatile semiconductor memory. For example, the flash memory 114 is implemented as a EPROM or EEPROM memory chip serving as a memory space in the wireless-communication-function-including memory media 110.

The wireless-communication-function-including memory media 110 is wire-connected to the digital camera 101 through the connector section 112 by way of which data is transferred between the wireless-communication-function-including memory media 110 and the digital camera 101. In addition, the wireless-communication-function-including memory media 110 also receives a driving power from the digital camera 101 through the connector section 112.

Figure 10:
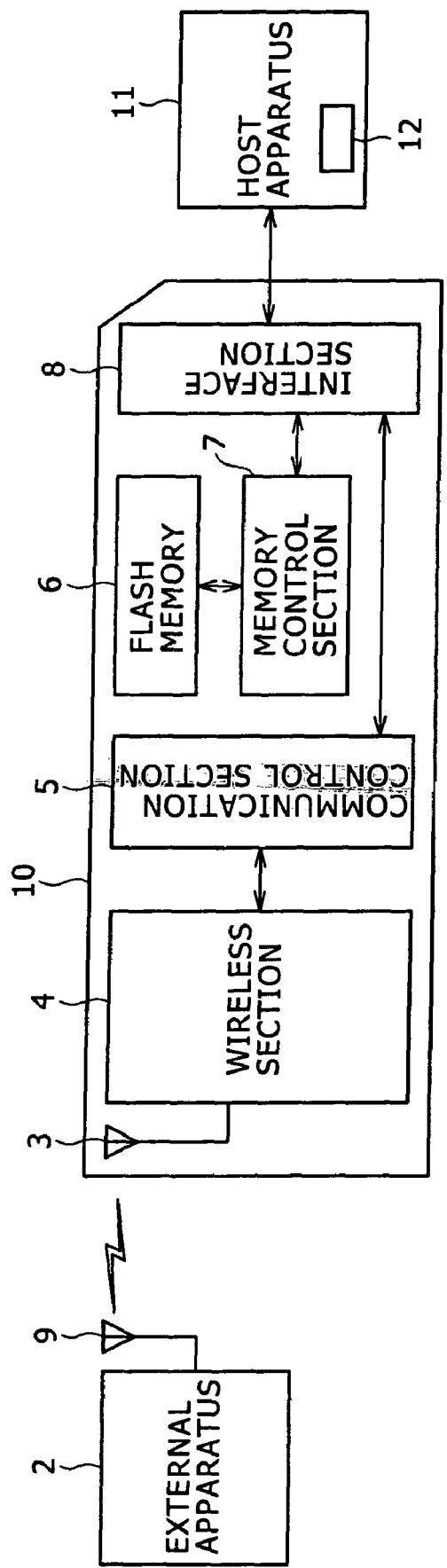
FIG. 10 is a diagram showing a typical configuration of a wireless-communication-function-including memory card.

The conventional memory media does not have a wireless communication function. In addition, the memory/communication control section 113 employed in the conventional memory media is no more than a memory control section for controlling operations to make accesses to the flash memory 114 as is the case with the memory control section 7 shown in FIG. 10. That is to say, the memory/communication control section 113 employed in the conventional memory media does not have a function for controlling wireless communication operations. On the other hand, the wireless-communication-function-including memory media 110 according to the embodiment has a wireless communication function implemented by the antenna 111 and the wireless section 115. Thus, the memory/communication control section 113 employed in the wireless-communication-function-including memory media 110 controls operations to make accesses to the flash memory 114 and wireless communication operations carried out by the wireless section 115.

Normally, the digital camera 101 makes an access to the flash memory 114 by way of the connector section 112 and the memory/communication control section 113. In the case of this embodiment, the wireless reader apparatus 102 is also capable of making an access to the flash memory 114 by way of the antenna 111, the wireless section 115 and the memory/communication control section 113.

A wireless communication operation controlled by the memory/communication control section 113 to send data read out from the flash memory 114 to the wireless reader apparatus 102 by wireless communication can be carried out independently of the digital camera 101, in which the wireless-communication-function-including memory media 110 has been mounted, and in accordance with control executed by the wireless reader apparatus 102. It is thus unnecessary to install a device driver in the digital camera 101 in order to send data read out from the flash memory 114 from the wireless-communication-function-including memory media 110 to the wireless reader apparatus 102 by wireless communication.

As described above, the digital camera 101 and the wireless-communication-function-including memory media 110 are connected to each other by the connector section 112 by wire communication. The digital camera 101 is capable of storing a taken image into the flash memory 114 by way of the connector section 112 in accordance with memory access control executed by the memory/communication control section 113 and reading out image data stored in the flash memory 114 through the connector section 112 also in accordance with memory access control executed by the memory/communication control section 113. In addition, the wireless section 115 is capable of carrying out a wireless communication operation in accordance with control executed by the memory/communication control section 113 and making an access to a taken image stored in the flash memory 114 also in accordance with memory access control executed by the memory/communication control section 113.

There is a problem that, unlike a wire interface, it is feared that a communication carried out through a wireless transmission line in the wireless section 115 may be interrupted in the course of the communication. In this case, data stored in the flash memory 114 may be destroyed inadvertently. In order to prevent data stored in the flash memory 114 from being destroyed inadvertently, it is possible to implement the embodiment into a configuration in which the memory/communication control section 113 allows the wireless section 115 to make only a request for an operation to read out data from the flash memory 114, but not a request for an operation to write data into the flash memory 114.

The wireless section 115 includes a sending section 116 and a receiving section 117, which are used for carrying out transmission of data by wireless communication utilizing a 2.4 GHz band referred to as an ISM (Industrial, Scientific and Medical) band. The sending section 116 carries out processes to output a signal to a wireless transmission line from the antenna 111. The processes include a process to encode data to be sent, a process to modulate the encoded data to result in a modulated analog wireless signal and an up-conversion process of the analog wireless signal to generate the output signal. The receiving section 117 carries out a down-conversion process on a wireless signal received by the antenna 111 to produce an analog signal and converts the analog signal into a digital signal. Then, the receiving section 117 carries out decoding and demodulation processes on the digital signal in order to analyze the received data.

Figure 2:
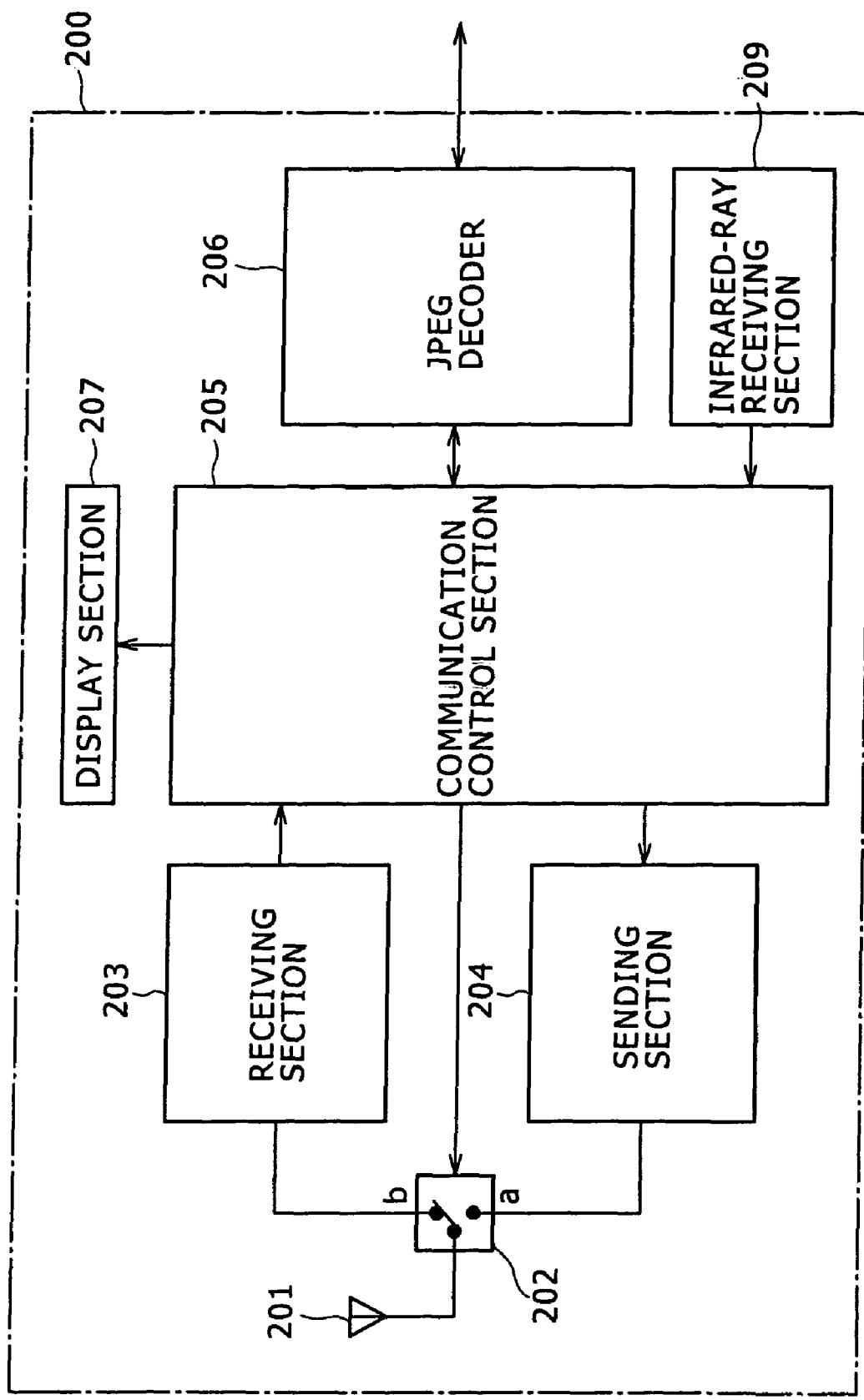
FIG. 2 is a diagram showing the functional configuration of a model of a wireless reader for receiving data from a wireless-communication-function-including memory media in the wireless communication system shown in FIG. 1.

FIG. 2 is a diagram showing the functional configuration of a model of the wireless reader apparatus 102 (200) for receiving image data such as JPEG and MPEG data from the wireless-communication-function-including memory media 110 in the wireless communication system shown in FIG. 1.

The wireless reader apparatus 102 (200) sends a control signal 103 to the wireless-communication-function-including memory media 110. The wireless reader apparatus 102 (200) also receives a response signal 104 from the wireless-communication-function-including memory media 110 and demodulates the received signal. If the response signal 104 is JPEG or MPEG image data, the wireless reader apparatus 102 (200) also needs to decode the response signal 104. For this reason, the wireless reader apparatus 102 (200) includes an antenna 201 functioning in the 2.4 GHz band described earlier, an antenna switch 202 for selecting reception or transmission as the operation of the antenna 201, a receiving section 203, a sending section 204, a communication control section 205 and a JPEG decoder 206.

In addition, the wireless reader apparatus 102 (200) also includes an infrared-ray receiving section 209 (109) for receiving a control signal 118 from the infrared remote controller 108 and supplying the control signal 118 to the communication control section 205. For example, the user can operate the infrared remote controller 108 to request the wireless reader apparatus 102 (200) to read image data from the wireless-communication-function-including memory media 110 mounted in the digital camera 101 and outputs the image data to the television set 106 as a video signal.

In an operation to send a signal from the wireless reader apparatus 102 (200) to the wireless-communication-function-including memory media 110, the communication control section 205 supplies a base-band signal completing a first-order modulation process such as the QPSK modulation process to the sending section 204. The sending section 204 carries out an up-conversion process on the base-band signal to generate a 2.4 GHz-band signal and amplifies the 2.4 GHz-band signal before outputting the amplified signal to the antenna 201 by way of the antenna switch 202.

In an operation to send a signal from the wireless-communication-function-including memory media 110 described above to the wireless reader apparatus 102 (200), on the other hand, the memory/communication control section 113 reads out the data to be sent from the flash memory 114 and converts the data into a base-band signal completing a QPSK modulation process. Then, the sending section 116 converts the base-band signal into a 2.4 GHz-band signal before sending the signal to the wireless reader apparatus 102 (200) by way of the antenna 111.

In the wireless reader apparatus 102 (200), the antenna 201 receives the modulated signal and supplies the received signal to the communication control section 205 by way of the antenna switch 202 and the receiving section 203. The communication control section 205 demodulates the modulated signal into the original signal. The communication control section 205 sets the contact point of the antenna switch 202 at position b at receiving time and position a at a sending time.

The JPEG decoder 206 converts the data obtained as a result of the demodulation process carried out by the communication control section 205 from JPEG data into an analog AV signal such as an NTSC signal conveying an image that can be seen through the television set 106 connected to the wireless reader apparatus 102 (200).

In addition, the communication control section 205 also controls communications with the wireless-communication-function-including memory media 110 and sends a control signal such as arrival confirmation information to the wireless-communication-function-including memory media 110 by way of the sending section 204, the antenna switch 202 and the antenna 201. The communication control section 205 is capable of displaying status indicating that data is being received from the wireless-communication-function-including memory media 110 by wireless communication on a display section 207 (120).

Figure 3:
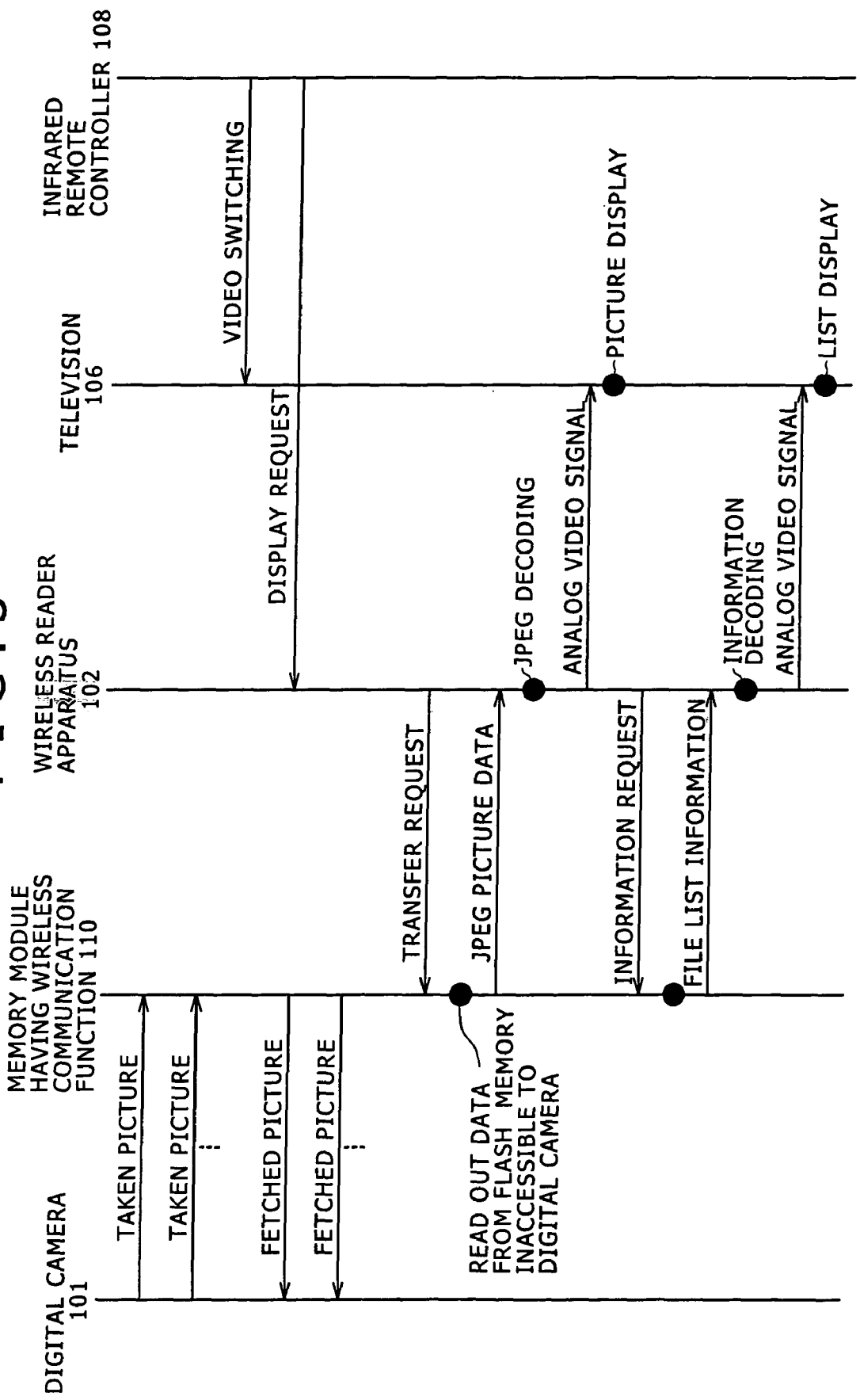
FIG. 3 is a diagram showing a control sequence in the wireless transmission system according to an embodiment of the present invention.

FIG. 3 is a diagram showing a control sequence in the wireless transmission system according to the embodiment. The control sequence shown in the figure is a sequence of communication operations carried out among the digital camera 101, the wireless-communication-function-including memory media 110 mounted in the digital camera 101, the wireless reader apparatus 102 (200), the television set 106 such as an ordinary television or another monitoring unit and the infrared remote controller 108 operated by the user.

Every time an image is taken by the digital camera 101, the digital camera 101 stores the taken image in the flash memory 114. Data of a taken image may be read out from the flash memory 114 in order to display the image on a viewer, which is shown in none of the figures.

The user operates the infrared remote controller 108 to display a desired image taken by the digital camera 101 on the television set 106.

The infrared remote controller 108 sends a video-switching signal to the television set 106 as a command to switch the operating mode of the television set 106. In accordance with this command, the television set 106 switches its operating mode from a mode to display a received broadcast picture to a mode to input an external video signal.

Then, the infrared remote controller 108 sends a display request signal to the wireless reader apparatus 102 (200). In accordance with this display request signal, the wireless reader apparatus 102 (200) sends a transfer request signal to the wireless-communication-function-including memory media 110.

Receiving the transfer request signal, the wireless-communication-function-including memory media 110 inhibits accesses made by the digital camera 101 as accesses to the flash memory 114 through the connector section 112 in order to get rid of contentions between the accesses made by the digital camera 101 as accesses to the flash memory 114 through the connector section 112 and accesses according to the transfer request signal as accesses to the flash memory 114 through the wireless section 115. Then, image data 104 is read out from the flash memory 114 and sent to the wireless reader apparatus 102 (200) as a video signal.

Receiving the image data sent by the wireless-communication-function-including memory media 110 by wireless communication, the wireless reader apparatus 102 (200) demodulates the received data and carries out a JPEG decoding process on a signal obtained as a result of the demodulation. Then, the wireless reader apparatus 102 (200) converts data obtained as a result of the JPEG decoding process into an analog video signal, which is then output to the television set 106 through the video cable 105.

As an alternative to the display request signal, the infrared remote controller 108 may send an information request signal, which makes a request for information on what image files have been stored in the flash memory 114 employed in the wireless-communication-function-including memory media 110, to the wireless reader apparatus 102 (200). In this case, the wireless reader apparatus 102 (200) sends the information request signal to the wireless-communication-function-including memory media 110, which then sends an image information signal conveying a list of image files to the wireless reader apparatus 102 (200) in response to the information request signal. Then, the television set 106 displays the list of image files. Looking at the list of image files, the user can then makes a request for a desired image file to be displayed on the television set 106.

While data is being received from the wireless-communication-function-including memory media 110, the communication control section 205 turns on the display section 207 to request the user to avoid an operation carried out on the digital camera 101.

As described above, by operating only the infrared remote controller 108, the user is capable of operating the television set 106 and directly and concurrently controlling a plurality of apparatus such as the wireless reader apparatus 102 (200), and the wireless-communication-function-including memory media 110 in the digital camera 101.

In the typical control sequence shown in FIG. 3, only one picture is sent even though the substance of the sent picture can of course be subjected to controlled image processing such as processes to generate a tabular display, an enlarged display, a shrunk display or a rotated display. Since the video-switching signal and display starting signal are used in common, the sending of the video switching signal can be eliminated.

As described above, the wireless-communication-function-including memory media 110 has a built-in wireless communication function including a function to read out data from the flash memory 114 of the wireless-communication-function-including memory media 110 independently of the host apparatus such as the digital camera 101. That is to say, an operation to send the data read out from the flash memory 114 to the wireless reader apparatus 102 (200) by wireless communication in accordance with control executed by the memory/communication control section 113 is independent of the digital camera 101 in which the wireless-communication-function-including memory media 110 has been mounted, and can be controlled by the wireless reader apparatus 102 (200) connected to the wireless-communication-function-including memory media 110 by a wireless communication line. In such a case, it is thus possible to send the data read out from the flash memory 114 from the wireless-communication-function-including memory media 110 to the wireless reader apparatus 102 (200) by wireless communication without the need to install a device driver in the digital camera 101.

The wireless communication interface between the wireless reader apparatus 102 (200) and the wireless-communication-function-including memory media 110 typically conforms to specifications such as the IEEE 802.11 standard serving as standard specifications of wireless LANs, Bluetooth communication or reflected-wave transmission.

In the wireless communication system, the wireless LAN is a LAN originally designed and developed by assuming utilization of computers. Thus, if the wireless-communication-function-including memory media 110 is mounted on a mobile apparatus, the power consumption of the wireless-communication-function-including memory media 110 becomes a problem. Most wireless LAN cards available at the present in the market as cards conforming to the IEEE 802.11b standard have a sending power consumption of at least 800 mW and a receiving power consumption of at least 600 mW. These power consumptions are a big load to be borne by a portable mobile apparatus, which is driven by power generated by a battery.

Even if the wireless LAN function is limited to operations for short distances to reduce its transmission power, the power consumption cannot be decreased considerably. In particular, an operation to transfer data from an image input apparatus such as a digital camera to an image display apparatus has a communication configuration with a transmission ratio representing occupation of most of the entire communication. Thus, in this case, wireless sending means with an even lower power consumption is required.

As for the communication conforming to the Bluetooth communication, the transmission speed is low, having a maximum of 720 kbps. Thus, for the contemporary image transmission with an improved picture quality, it takes time to send an image, hence, giving rise to inconvenience.

In the case of the reflected-wave communication in which a back scatter communication is carried out as a communication of outputting a reflected-wave signal modulated in accordance with data being sent as a reflected wave of a received wave, on the other hand, in a transmission configuration with transmission ratio of an electromagnetic-wave reflector representing occupation of most of the entire communication, among other things, reduction of the power consumption can be implemented.

A reflected-wave transmission system includes an electromagnetic-wave reflector for sending data as a reflected wave modulated by using the data being sent and a reflected-wave reader for fetching data from a reflected wave received from the electromagnetic-wave reflector. In an operation to request that data be sent from the electromagnetic-wave reflector to the reflected-wave reader, first of all, the reflected-wave reader sends an unmodulated carrier to the electromagnetic-wave reflector. Then, in a process carried out by the electromagnetic-wave reflector to send the requested data to the reflected-wave reader in response to the request, the electromagnetic-wave reflector modulates the unmodulated carrier on the basis of the data being sent by merely carrying out only a switching operation such as an operation to connect and disconnect a termination load to and from an antenna employed in the electromagnetic-wave reflector in order to change the load impedance of the antenna. Then, the reflected-wave reader demodulates and decodes the reflected wave, which conveys the data sent by electromagnetic-wave reflector, in order to acquire the requested original data.

The electromagnetic-wave reflector has the aforementioned antenna for reflecting a continuous incoming wave, a circuit for generating data to be sent and an impedance variation circuit for varying the load impedance of the antenna in accordance with the data being sent. For more information, refer to a document such as Japanese Patent Laid-open No. Hei 01-182782.

In the reflected-wave transmission system, as an antenna switch for varying the load impedance of the antenna employed in the electromagnetic-wave reflector to modulate the reflected wave, in general, an IC made of gallium arsenic is employed. Its power consumption is several tens of microwatts or smaller. To be more specific, in the case of an arrival confirmation method requiring the reflected-wave reader to send an acknowledgement signal to the electromagnetic-wave reflector as a signal acknowledging reception of data from the electromagnetic-wave reflector, the average power consumed at a data transmission time is smaller than several tens of milliwatts. In the case of a simplex data transmission technique not requiring the reflected-wave reader to send such an acknowledgement signal to the electromagnetic-wave reflector, on the other hand, data can be sent at a power consumption of several tens of microwatts. These power consumptions provide an extremely large difference in performance in comparison with the average power consumption for an ordinary wireless LAN. For more information, refer to a document such as Japanese Patent Laid-open No. 2003-291809. Thus, even in the case of an information storage device mounted on a battery-powered mobile apparatus such as a digital camera, the power consumption for a data transmission operation can be reduced to substantially lengthen the life of the battery driving the mobile apparatus.

With the reflected-wave transmission method applied to the wireless communication function between the wireless-communication-function-including memory media 110 and the wireless reader apparatus 102 (200), the wireless section 115 employed in the wireless-communication-function-including memory media 110 operates as the electromagnetic-wave reflector reflecting an incoming wave as a modulated wave conveying data requested by the wireless reader apparatus 102 (200) serving the reflected-wave reader in, for example, page units. Since such a data transmission operation is controlled by the wireless reader apparatus 102 (200), it is possible to solve a problem to install a new device driver in the digital camera 101, in which the wireless-communication-function-including memory media 110 including the wireless section 115 is mounted, as an issue accompanying a change in communication-protocol version and solve a problem to update the device driver in accordance with such a change.

Next, the following description explains details of a configuration including the wireless section 115 employed in the wireless-communication-function-including memory media 110 and the wireless reader apparatus 102 (200) for a case in which the reflected-wave transmission system is applied to a wireless communication between the wireless section 115 and the wireless reader apparatus 102 (200).

Figure 4:
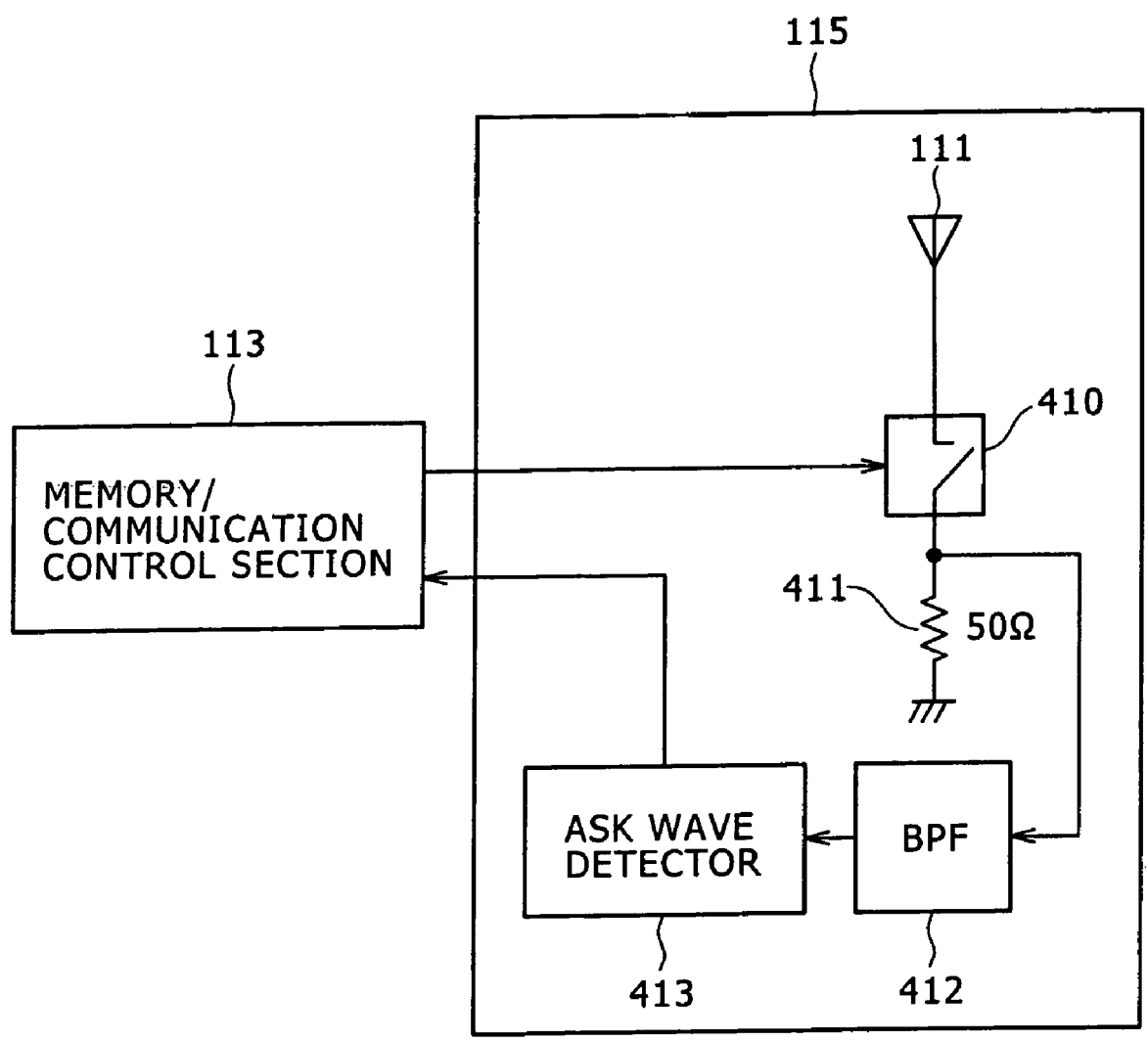
FIG. 4 is a diagram showing the configuration of a wireless section employed in the wireless-communication-function-including memory media adopting a reflected-wave transmission method.

FIG. 4 is a diagram showing the configuration of the wireless section 115 employed in the wireless-communication-function-including memory media 110 adopting a reflected-wave transmission method. The wireless section 115 shown in the figure has the antenna 111 described above, an antenna switch 410, an antenna load 411, a BPF (Band Pass Filter) 412 and an ASK detection section 413. In this embodiment, as the frequency of the wireless wave, the 2.4 GHz band referred to as an ISM band is used.

In an operation to send picture data stored in the flash memory 114 to an external apparatus such as the wireless reader apparatus 102 (200), for example, first of all, the memory/communication control section 113 driven by the wireless section 115 acquires the data from the flash memory 114. Then, in accordance with the bit image of the data being sent, the memory/communication control section 113 turns on and off the antenna switch 410 connected to the antenna 111. For example, the antenna switch 410 is turned on for a data bit of 1 and turned off for a data bit of 0.

As shown in FIG. 4, when the antenna switch 410 is turned on, the antenna 111 is connected to an antenna load 411 of 50 ohms and, when the antenna switch 410 is turned off, on the other hand, the antenna 111 is disconnected from the antenna load 411. The operation to turn on and off the antenna switch 410 results in behaviors of the wireless-communication-function-including memory media 110 in which, with the antenna switch 410 turned on to connect the antenna 111 to the antenna load 411, a wave received from the external apparatus is terminated by the antenna load 411 and, with the antenna switch 410 turned off to disconnect the antenna 111 from the antenna load 411, on the other hand, this wave described above is reflected back to the external apparatus. Thus, the external apparatus serving as a data transmission target is capable of fetching the image data as variations in reflected wave. This is because the wireless-communication-function-including memory media 110 sends a wave, which is basically modulated by varying the load impedance of the antenna 111 in the operation to turn on and off the antenna switch 410 in accordance with the bit image of the data, as a reflected wave of a wave originated by the external apparatus serving as a data transmission target. A communication method of reflecting a wave modulated in this way is referred to as a back scatter method. The signal reflected by the wireless section 115 is equivalent to a wave signal completing an ASK modulation process. In this reflected-wave transmission method, however, the reflected signal can also be obtained by carrying out a PSK or FSK modulation process as an alternative to the ASK modulation process.

As the antenna switch 410 for varying the load impedance of the antenna 111 to modulate the reflected wave, in general, an IC made of gallium arsenic is employed. The power consumption of the IC made of gallium arsenic is not greater than several tens of microwatts. Thus, by adoption of the communication method described above, wireless transmissions of pictures can be implemented at a very low power consumption.

The band pass filter 412 and the ASK detection section 413 are used when an arrival acknowledgement signal completing an ASK modulation process is received from the external apparatus serving as a data transmission target. Thus, in a simplex data transmission requiring no arrival acknowledgement signal, the band pass filter 412 and the ASK detection section 413 are not needed. If an arrival acknowledgement signal is required, on the other hand, the memory/communication control section 113 controls the arrival confirmation.

The band pass filter 412 is employed for the purpose of passing a signal having a frequency of the 2.4 GHz band but attenuating signals having different frequencies. It is possible to implement an ASK detection section 413 with a power consumption of not greater than 30 mW in case an arrival acknowledgement signal of the arrival confirmation method described above is required.

The average amount of power consumed by the wireless communication apparatus shown in FIG. 4 to send data from the wireless communication apparatus to the external apparatus serving as a data transmission target can be reduced to a value not greater 10 mW in case an arrival acknowledgement signal of the arrival confirmation method is required and a value equal to several tens of microwatts in case no arrival acknowledgement signal is required. These power consumptions provide an extremely large difference in performance in comparison with the average power consumption for an ordinary wireless LAN. In addition, the area of a module implementing the wireless section 115 can be reduced substantially in comparison with that of an ordinary wireless LAN.

Figure 5:
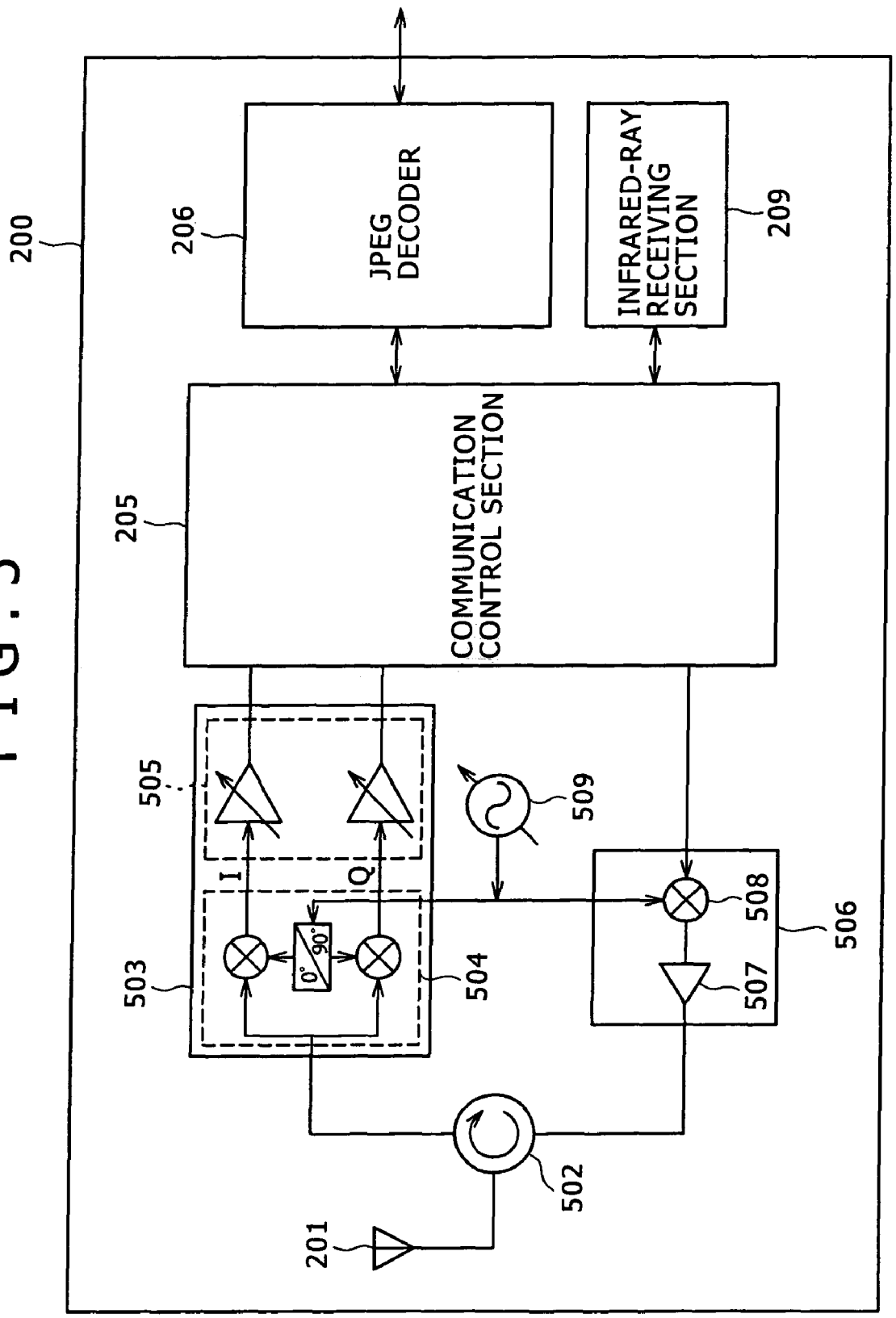
FIG. 5 is a diagram showing the hardware configuration of the wireless reader adopting a reflected-wave transmission method.

FIG. 5 is a diagram showing the hardware configuration of a model of the wireless reader apparatus 102 (200) adopting a reflected-wave transmission method as a wireless communication interface.

Since the wireless-communication-function-including memory media 110 sends image data to the wireless reader apparatus 102 (200) as a reflected wave, the wireless reader apparatus 102 (200) needs to send an unmodulated carrier in advance to the wireless-communication-function-including memory media 110 as a carrier from which the reflected wave is to be generated by the wireless-communication-function-including memory media 110. As shown in FIG. 5, the wireless reader apparatus 102 (200) includes a 2.4 GHz band antenna 201, a circulator 502 serving as a substitute for an antenna switch described above, an orthogonal detection section 504, an AGC amplifier 505, a power amplifier 507, a mixer 508 and a frequency synthesizer 509. The orthogonal detection section 504 and the AGC amplifier 505 form a receiving section 503 whereas the power amplifier 507 and the mixer 508 form a sending section 506. In addition, the wireless reader apparatus 102 (200) also has a communication control section 205, a JPEG decoder 206, a display section 207 not shown in the figure and an infrared-ray receiving section 209, which each have a configuration and operation identical with respectively the communication control section 205, JPEG decoder 206, display section 207 and infrared-ray receiving section 209 described earlier by referring to FIG. 2. Thus, the descriptions of the communication control section 205, the JPEG decoder 206, the display section 207 and the infrared-ray receiving section 209 are not repeated.

In order to send an unmodulated carrier from the sending section 506, the communication control section 205 applies a DC voltage to the mixer 508 as a control signal. The frequency of the unmodulated carrier being sent is the frequency of a signal output by the frequency synthesizer 509 to the mixer 508, which is controlled by the communication control section 205. In this embodiment, as the frequency of the unmodulated carrier, the 2.4 GHz band referred to as an ISM band is used. The unmodulated carrier generated by the mixer 508 is amplified by the power amplifier 507 to a predetermined level. The unmodulated carrier obtained as a result of the amplification is output to the antenna 201 by way of the circulator 502.

An electromagnetic wave reflected by the wireless-communication-function-including memory media 110 has the same frequency as the unmodulated carrier sent by the wireless reader apparatus 102 (200). The electromagnetic-wave reflected by the wireless-communication-function-including memory media 110 is received by the antenna 201 and supplied to the receiving section 503 by way of the circulator 502. The orthogonal detection section 504 employed in the receiving section 503 also receives a signal having the same local frequency as the frequency for generating the transmission frequency of the unmodulated carrier. Thus, the orthogonal detection section 504 outputs the same signals as the modulated signal completing the ASK modulation in the wireless section 115 employed in the wireless-communication-function-including memory media 110. Since the received signal has a phase different from the signal having the local frequency, the signals output by the orthogonal detection section 504 are an I-axis signal and a Q-axis signal, which are the modulated signals depending on the difference in phase.

The I-axis signal and the Q-axis signal are supplied to the AGC amplifier 505, which has a gain controlled to an adaptive value. Amplified signals output by the AGC amplifier 505 are supplied to the communication control section 205. The communication control section 205 demodulates the I-axis signal and the Q-axis signal to generate correct data, which is then decoded by the JPEG decoder 206 adopting the JPEG decoding technique. Later on, for example, the data obtained as a result of the JPEG decoding process is further converted into an analog video signal, which is then supplied to the television set 106 through the video cable 105. As an alternative, data obtained as a result of a rendering process of the image is supplied to a printer, which is not shown in the figure, to be printed out on a piece of paper.

If it is necessary to confirm the arrival of image data from the wireless-communication-function-including memory media 110, the communication control section 205 supplies an ACK (Acknowledgement) signal or a NACK (Negative Acknowledgement) signal to the mixer 508 for carrying an ASK modulation process on the signal. The ACK signal is supplied to the mixer 508 if the packet data received from the wireless-communication-function-including memory media 110 is found correct whereas the NACK signal is supplied to the mixer 508 if the packet data received from the wireless-communication-function-including memory media 110 is found incorrect. A CRC (Cyclic Redundancy Check) code included in the packet of the image data is used for determining whether the packet data is correct or incorrect.

Figure 6:
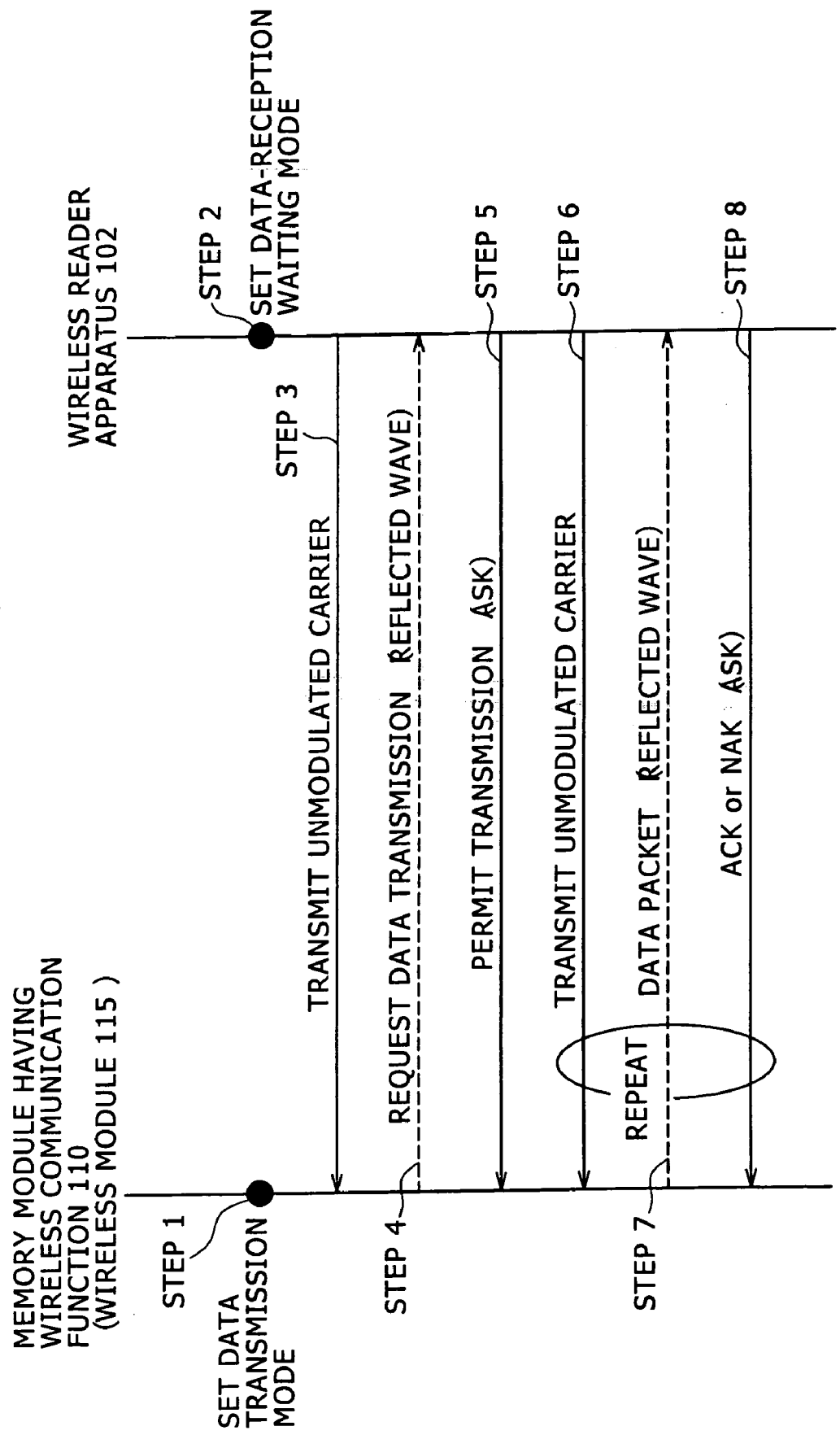
FIG. 6 is a diagram showing a sequence of control executed for carrying out wireless transmissions between the wireless section shown in FIG. 4 as a section employed in the wireless-communication-function-including memory media and the wireless reader shown in FIG. 5.

FIG. 6 is a diagram showing a sequence of control executed for carrying out wireless transmissions between the wireless section 115 shown in FIG. 4 as a section employed in the wireless-communication-function-including memory media 110 and the wireless reader apparatus 102 (200) shown in FIG. 5. In the typical control sequence shown in FIG. 6, however, it is assumed that the wireless reader apparatus 102 (200) needs to confirm an arrival of data from the wireless-communication-function-including memory media 110. The sequence of control is described as follows.

Step 1

In accordance with a procedure for receiving a control signal 103 from the wireless reader apparatus 102 (200) or another procedure, the wireless-communication-function-including memory media 110 switches the operating mode from a wire communication mode for communications through the connector section 112 to a wireless communication mode.

Step 2

By the same token, in accordance with a procedure for receiving an infrared command from the infrared remote controller 108 or another procedure, the wireless reader apparatus 102 (200) sets a data-reception-waiting mode.

Step 3

Then, the wireless reader apparatus 102 (200) sends an unmodulated carrier to be reflected by the wireless-communication-function-including memory media 110 as a reflected-wave signal to the wireless-communication-function-including memory media 110.

Step 4

Receiving the unmodulated carrier, the wireless section 115 employed in the wireless-communication-function-including memory media 110 uses the unmodulated carrier to notify the wireless reader apparatus 102 (200) that data will be sent from the wireless-communication-function-including memory media 110 to the wireless reader apparatus 102 (200).

Step 5

Receiving the notice of a transmission of data, the wireless reader apparatus 102 (200) sends a permission signal completing an ASK modulation process as a permission to send the data to the wireless-communication-function-including memory media 110.

Step 6

Then, the wireless reader apparatus 102 (200) sends an unmodulated carrier to be reflected by the wireless-communication-function-including memory media 110 as a reflected-wave signal conveying the data to be sent by the wireless-communication-function-including memory media 110 to the wireless reader apparatus 102 (200). Examples of the data sent by the wireless-communication-function-including memory media 110 to the wireless reader apparatus 102 (200) are image data and a list of data files.

Step 7

Receiving the unmodulated carrier, the wireless section 115 employed in the wireless-communication-function-including memory media 110 modulates the reflected wave to send data put in a packet to the wireless reader apparatus 102 (200).

Step 8

The wireless reader apparatus 102 (200) sends an ACK (Acknowledgement) signal completing an ASK modulation process to the wireless-communication-function-including memory media 110 if the packet data received from the wireless-communication-function-including memory media 110 is found correct or a NACK (Negative Acknowledgement) signal also completing an ASK modulation process to the wireless-communication-function-including memory media 110 if the packet data is found incorrect. A CRC (Cyclic Redundancy Check) code included in the packet of the image data is used for determining whether the packet data is correct or incorrect.

When the wireless reader apparatus 102 (200) sends an ACK or NACK signal to the wireless-communication-function-including memory media 110 as an arrival acknowledgement signal, the wireless reader apparatus 102 (200) may include a command issued to the wireless-communication-function-including memory media 110 in the signal.

Thereafter, steps 6 to 8 are executed repeatedly till all the data is sent from the wireless-communication-function-including memory media 110 to the wireless reader apparatus 102 (200).

In the communication sequence described above, an image is sent from the wireless-communication-function-including memory media 110 to the wireless reader apparatus 102 (200). The communication is a duplex communication in that an arrival acknowledgement signal is sent from the wireless reader apparatus 102 (200) to the wireless-communication-function-including memory media 110 to acknowledge the arrival of the image at the wireless reader apparatus 102 (200). In the case of a transmission of streaming data such as the case of a video camera, however, the transmission can also be a simplex transmission. In the case of a simplex transmission, the wireless reader apparatus 102 (200) does not have to send an arrival acknowledgement signal completing an ASK modulation process to the wireless-communication-function-including memory media 110. Thus, since the wireless-communication-function-including memory media 110 receives no arrival acknowledgement signal, the power consumption can be further reduced.

Figure 7:
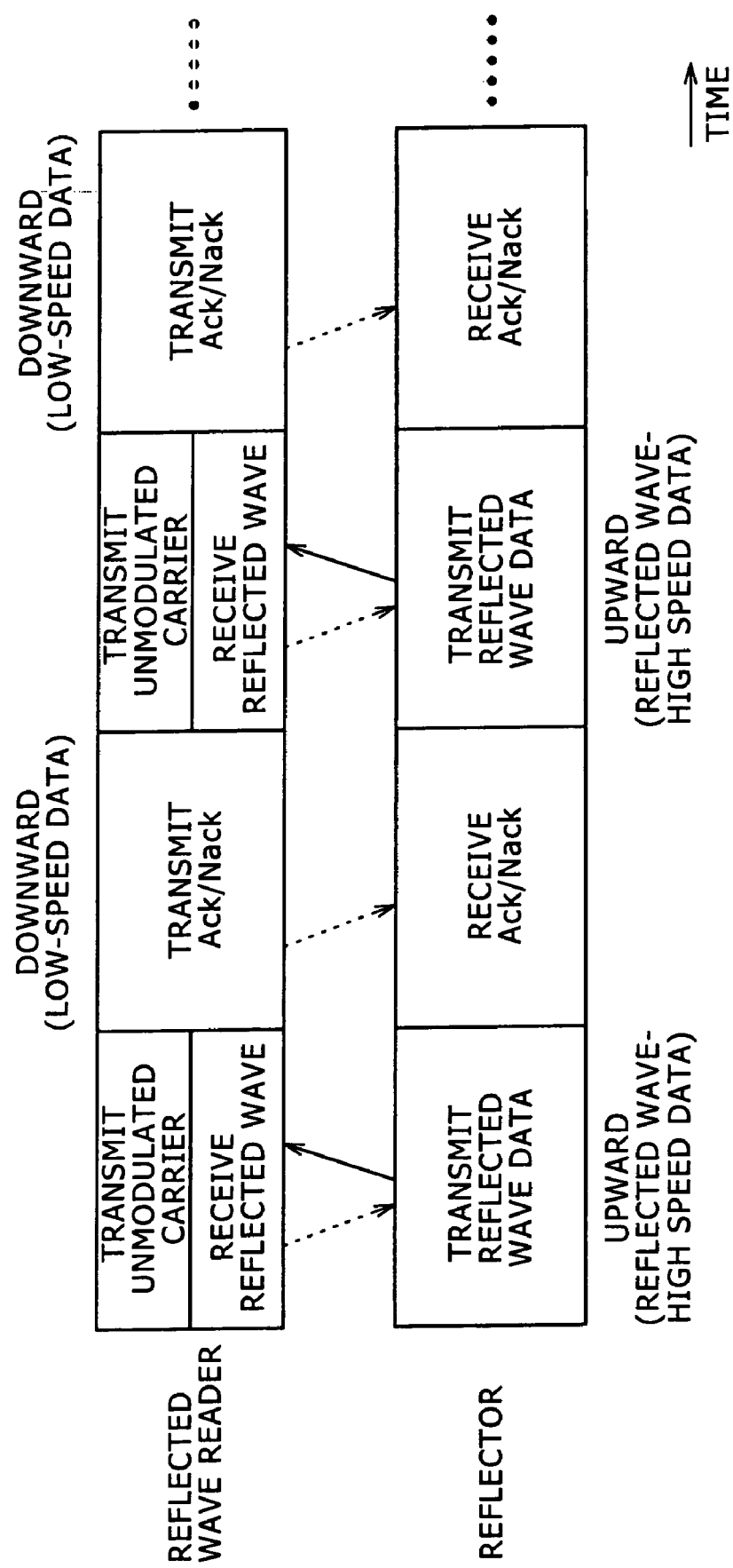
FIG. 7 is a diagram showing typical operations carried out by a reflected-wave transmission system adopting a TDM (Time Division Multiplex) method.

FIG. 7 is a diagram showing typical operations carried out by a reflected-wave transmission system including a reflected-wave reader and an electromagnetic-wave reflector, which adopt a TDM (Time Division Multiplex) method. Since the reflected-wave transmission system adopts a reflection technique, the reflected-wave reader repeats a state of sending an unmodulated carrier to the electromagnetic-wave reflector and receiving the reflected wave of the carrier from the electromagnetic-wave reflector, as well as a state of sending data as a signal modulated by the reflected-wave reader to the electromagnetic-wave reflector. On the other hand, the electromagnetic-wave reflector repeats a state of putting data being sent to the reflected-wave reader on the unmodulated carrier and sending the carrier conveying the data to the reflected-wave reader, and a state of receiving the signal modulated by the reflected-wave reader from the reflected-wave reader. In this case, the reflected-wave reader is the wireless reader apparatus 102 (200) whereas the electromagnetic-wave reflector is the wireless-communication-function-including memory media 110.

The reflected-wave system is an asymmetrical transmission system in which the transmission speed in the upward direction from the electromagnetic-wave reflector to the reflected-wave reader is higher than the transmission speed in the downward direction from the reflected-wave reader to the electromagnetic-wave reflector. Thus, in the case of a communication configuration in which the ratio of transmission from the wireless-communication-function-including memory media 110 serving as an electromagnetic-wave reflector represents occupation of most of the transmission as described earlier, by increasing the ratio of transmission, data transmissions at a low power consumption can be implemented.

FIG. 11 is a diagram showing the configuration of a model of a wireless transmission system according to a second embodiment of the present invention. As shown in the figure, much like the first embodiment described earlier, the wireless transmission system includes a digital camera 101, a wireless-communication-function-including memory media 110, a wireless reader apparatus 102 (200), a television set 106 and an infrared remote controller 108.

The wireless-communication-function-including memory media 110 is plugged into typically a dedicated memory slot provided in the digital camera 101 but not shown in the figure and connected to the digital camera 101 through a connector section 112. The connector section 112 serves as a wire communication interface between the wireless-communication-function-including memory media 110 and the digital camera 101, typically conforming to standard interface specifications such as memory-stick specifications, PC-card specifications or USB specifications.

The digital camera 101 is capable of making an access to a flash memory 114 of the wireless-communication-function-including memory media 110 by way of the connector section 112. Thus, the digital camera 101 is capable of storing a taken image into the flash memory 114 and reading out data of an image or the like from the flash memory 114. In addition, the wireless-communication-function-including memory media 110 receives a driving power from the digital camera 101 through the connector section 112.

On top of that, the wireless-communication-function-including memory media 110 has a wireless section 115 serving as a wireless communication interface between the wireless-communication-function-including memory media 110 and the wireless reader apparatus 102 (200). The wireless section 115 includes a sending section 116 and a receiving section 117, which are used for carrying out wireless transmissions between the wireless-communication-function-including memory media 110 and the wireless reader apparatus 102 (200). For example, the wireless reader apparatus 102 (200) sends a control signal 103 by wireless communication to the wireless-communication-function-including memory media 110 mounted in the digital camera 101. In response to this control signal 103, the wireless-communication-function-including memory media 110 sends a response signal 104 conveying JPEG image data by wireless communication.

In addition, the wireless reader apparatus 102 (200) is connected to an external video input terminal of the television set 106 through a video cable 105. Thus, the wireless reader apparatus 102 (200) is capable of outputting a video signal conveying image data acquired from the wireless-communication-function-including memory media 110 to the external video input terminal of the television set 106 through the video cable 105.

The television set 106 has an infrared-ray receiving section 107 and the wireless reader apparatus 102 (200) has an infrared-ray receiving section 109. The infrared-ray receiving section 107 and the infrared-ray receiving section 109 are each used for receiving an infrared ray conveying a control command from the infrared remote controller 108. The television set 106 and the wireless reader apparatus 102 (200) each carry out an operation according to a control command conveyed in the received infrared ray. The infrared remote controller 108 sends an infrared ray as a control signal 118 conveying the control command to the infrared-ray receiving section 109 employed in the wireless reader apparatus 102 (200) and the infrared-ray receiving section 107 employed in the television set 106. For example, the user is capable of operating the infrared remote controller 108 to request the wireless reader apparatus 102 (200) to output image data acquired from the wireless-communication-function-including memory media 110 mounted on the digital camera 101 to the television set 106 through the video cable 105 and capable of requesting the television set 106 to display the image data received from the wireless reader apparatus 102 (200) through the video cable 105 on the screen of the television set 106.

As shown in FIG. 11, the wireless-communication-function-including memory media 110 includes an antenna 111, a wireless section 115, a flash memory 114 serving as an actual memory space in the wireless-communication-function-including memory media 110, a memory/communication control section 113 and a connector section 112.

The wireless-communication-function-including memory media 110 is wire-connected to the digital camera 101 through the connector section 112 by way of which data is transferred between the wireless-communication-function-including memory media 110 and the digital camera 101. In addition, the wireless-communication-function-including memory media 110 also receives a driving power from the digital camera 101 through the connector section 112.

The memory/communication control section 113 is a unit for controlling accesses to the flash memory 114 and wireless communications carried out by the wireless section 115. To put it concretely, the memory/communication control section 113 controls an operation to output data read out from the flash memory 114 to the antenna 111 by way of the wireless section 115. In addition, the memory/communication control section 113 includes an address storage section 113A for storing the address of a most recently accessed location in the flash memory 114. The address includes a physical block number and page number of the accessed location in the flash memory 114.

The wireless reader apparatus 102 (200) is capable of controlling a wireless communication operation carried out by the memory/communication control section 113 to send data, which is read out from the flash memory 114, by a wireless communication independently of the digital camera 101 including the wireless-communication-function-including memory media 110 mounted therein. Thus, data read out from the flash memory 114 can be sent from the wireless-communication-function-including memory media 110 to the wireless reader apparatus 102 (200) by a wireless communication without the need to install a device driver in the digital camera 101, in which the wireless-communication-function-including memory media 110 has been mounted.

It is assumed that, in the data communication system according to the embodiment of the present invention, data is exchanged between the wireless-communication-function-including memory media 110 and the wireless reader apparatus 102 (200) by way of the wireless communication section 115 as well as between the wireless-communication-function-including memory media 110 and the digital camera 101 by way of the connector section 112 serving as a wire communication section. In an operation to exchange data between two apparatuses, that is, an operation to send data from a sending apparatus serving as a data sender to a receiving apparatus serving as a data receiver, in general, the data sender specifies a file containing the data to be sent to the data receiver and the data receiver before actually sending the file to the data receiver. When the wireless-communication-function-including memory media 110 serving as a data sender sends a picture taken by an image pick-up apparatus such as a digital camera 101 to a PC serving as a data receiver, for example, the wireless-communication-function-including memory media 110 holding the taken picture is first of all connected to the PC and then it is necessary to specify a file of the taken picture to be sent before carrying out an operation to send the file to the PC. The wireless-communication-function-including memory media 110 may be connected to the PC by a reflected-wave transmission line described earlier. In this case, the user needs to carry out an operation to adjust directivity from the wireless-communication-function-including memory media 110 toward the PC in addition to the operation to specify a file to be sent from the wireless-communication-function-including memory media 110 to the PC.

As described above, the user needs to specify a file of the data to be sent and carry out an operation to adjust directivity from the wireless section 115 employed in the wireless-communication-function-including memory media 110 to a data receiver such as the PC every time a file is sent from the wireless-communication-function-including memory media 110 to the data receiver. The works to specify a file and adjust directivity are cumbersome.

In the case of the memory media according to the second embodiment, on the other hand, the memory/communication control section 113 for controlling accesses to the flash memory 114 employed in the wireless-communication-function-including memory media 110 and wireless communications carried out by the wireless section 115 to send accessed data to an external apparatus includes an address storage section 113A for storing an address of a most recently accessed location in the flash memory 114. The most recently accessed address used for indicating a location in the flash memory 114 can be assumed to be an address for storing a file the user wants to view most eagerly. This is because the user has a habit of verifying the file the user wants to view most eagerly by previewing the file prior to transmission of the file. In other cases, the data to be transferred is specified by making a last access to a file containing the data the user wants to view most in a data transfer operation.

In such a case, an information apparatus or external apparatus serving as a data transfer destination such as the wireless reader apparatus 102 (200) or the digital camera 101 acquires an address from the address storage section 113A described before. Then, on the basis of the acquired address, the data transfer destination apparatus identifies a most recently accessed file assumed to contain desired data, and requests the memory media 110 through the memory/communication control section 113 to send the file.

The control sequence of the wireless communication system according to the embodiment is similar to the operation sequence shown in FIG. 3.

Every time the digital camera 101 takes a picture, the digital camera 101 stores the taken picture in the flash memory 114. Data of a taken image may be read out from the flash memory 114 in order to display the image on a viewer, which is shown in none of the figures.

The user operates the infrared remote controller 108 to display a desired image taken by the digital camera 101 on the television set 106.

The infrared remote controller 108 sends a video-switching signal to the television set 106 as a command to switch the operating mode of the television set 106. In accordance with this command, the television set 106 switches its operating mode from a mode to display a received picture to a mode to input an external video signal.

Then, the infrared remote controller 108 sends a display request signal to the wireless reader apparatus 102 (200). In accordance with this display request signal, the wireless reader apparatus 102 (200) sends a transfer request signal to the wireless-communication-function-including memory media 110.

Receiving the transfer request signal, the wireless-communication-function-including memory media 110 inhibits accesses made by the digital camera 101 as accesses to the flash memory 114 through the connector section 112 in order to get rid of contentions between the accesses made by the digital camera 101 as accesses to the flash memory 114 through the connector section 112 and accesses according to the transfer request signal as accesses to the flash memory 114 through the wireless section 115. Then, image data 104 is read out from the flash memory 114 and sent to the wireless reader apparatus 102 (200) as a video signal.

Receiving the image data sent by the wireless-communication-function-including memory media 110 by a wireless communication, the wireless reader apparatus 102 (200) demodulates the received data and carries out a JPEG decoding process on a signal obtained as a result of the demodulation. Then, the wireless reader apparatus 102 (200) converts data obtained as a result of the JPEG decoding process into an analog video signal, which is then output to the television set 106 through the video cable 105.

As a method of specifying which file stored in the flash memory 114 is to be transferred to the wireless reader apparatus 102 (200), one of the following techniques can be adopted.

(1) The wireless reader apparatus 102 (200) specifies a file name whereas the wireless-communication-function-including memory media 110 searches a file structure in the flash memory 114 for a file having the specified file name and sends the file found in the search to the wireless reader apparatus 102 (200). The file structure is stored in the flash memory 114 employed in the wireless-communication-function-including memory media 110 as a FAT (File Allocation Table) used for managing files.

(2) The wireless reader apparatus 102 (200) searches the file structure (or the FAT) in the flash memory 114 employed in the wireless-communication-function-including memory media 110 for a desired file and identifies a block number and page number of the file. Then, the wireless reader apparatus 102 (200) sends the identified block and page numbers to the wireless-communication-function-including memory media 110. In the case of this file-specifying method, the wireless reader apparatus 102 (200) includes a FAT used for managing files as information on a desired file.

For either of the file-specifying methods described above, the user needs to specify the file of the data to be sent and adjust the directivity of the wireless section 115 employed in the wireless-communication-function-including memory media 110 toward the PC, bearing a cumbersome workload.

In the case of the wireless-communication-function-including memory media 110 according to this embodiment, on the other hand, the memory/communication control section 113 includes an address storage section 113A for storing an address of a most recently accessed location in the flash memory 114 and, on the basis of the address stored in the address storage section 113A, a file the user wants to view most eagerly can be inferred. In other cases, it is possible to assume that a file to be sent is file the user wants to view most eagerly. Thus, the address stored in the address storage section 113A can be used for specifying the file to be sent.

For the reasons described above, the wireless reader apparatus 102 (200) or the memory/communication control section 113 employed in the wireless-communication-function-including memory media 110 acquires an address from the address storage section 113A and, on the basis of the acquired address, the wireless reader apparatus 102 (200) or the memory/communication control section 113 is capable of specifying a most recently accessed file as a file, which is to be sent, without an operation carried out by the user to specify such a file.

Of course, the most recently accessed address stored in the address storage section 113A is not necessarily the address of a desired file that the user wants to specify. In such a case, much like the first embodiment, the wireless reader apparatus 102 (200) may send an information request signal to the wireless-communication-function-including memory media 110 as a request for a list of image files stored in the flash memory 114. In response to the information request signal, the wireless-communication-function-including memory media 110 sends an image information signal conveying the list of image files to the wireless reader apparatus 102 (200). Then, the wireless reader apparatus 102 (200) displays the list of image files on the television set 106. By referring to the list of image files, the user can then select a desired file and makes a request for a display of the selected file.

As described above, the latter file-specifying method is adopted if the FAT is provided in the wireless reader apparatus 102 (200) as a table for managing files. A mechanism of wireless-communication control for the latter file-specifying method is explained as follows. As explained earlier, in this case, the wireless reader apparatus 102 (200) searches the FAT showing the file structure in the flash memory 114 employed in the wireless-communication-function-including memory media 110 for a desired file and identifies a block number and page number of the file. Then, the wireless reader apparatus 102 (200) sends the identified block and page numbers to the wireless-communication-function-including memory media 110 as information on a desired file.

FIG. 12 is a diagram showing the functional configuration of a model of a communication control section 205 employed in the wireless reader apparatus 102 (200) in the wireless transmission system shown in FIG. 11. As shown in the figure, the communication control section 205 includes two large sections, i.e., a communication control functional section and a host functional section.

The communication control functional section has a modulation-processing section 1201, a demodulation-processing section 1202 and a protocol control section 1203. The modulation-processing section 1201 is a unit for modulating a signal to be sent in a reflection-wave transmission. The demodulation-processing section 1202 is a unit for demodulating a received signal. The protocol control section 1203 is a unit for executing protocol control of establishing and discontinuing a reflection-wave communication in accordance with a predetermined communication protocol.

The host functional section has a communication control section 1204, a data control section 1205, a file control section 1206 and a management section 1207. The communication control section 1204 is a unit for controlling communication operations carried out by the communication control functional section.

The data control section 1205 is a driver control unit for writing data into the flash memory 114 or reading data from the flash memory 114 in sector or page units, which are a smallest physical access unit typically having a size of 512 bytes. The file control section 1206 is a unit corresponding to a FAT file system for writing data into the flash memory 114 or reading data from the flash memory 114 in file units, that is, a unit for writing and reading out file data. The management section 1207 is a unit serving as a user interface of the host functional section as well as a unit for executing general control of the entire host functional section. As a user interface of the host functional section, the management section 1207 carries out operations such as an operation to receive a command from the user.

The modulation-processing section 1201 modulates sent data output by the host functional section. Then, the modulated data is conveyed by an unmodulated carrier, which is being sent to the wireless-communication-function-including memory media 110. In the downward transmission from the wireless reader apparatus 102 (200) to the wireless-communication-function-including memory media 110, generally, the ASK modulation technique is adopted in order to make detection of modulated data easy to carry out in the wireless-communication-function-including memory media 110.

FIG. 13 is a diagram showing the functional configuration of a model of the memory/communication control section 113 employed in the wireless-communication-function-including memory media 110. As shown in the figure, the memory/communication control section 113 includes a communication control functional section and a memory-access function section 1304.

The communication control functional section has a modulation-processing section 1301, a demodulation-processing section 1302 and a protocol control section 1303. The modulation-processing section 1301 is a unit for modulating a signal being sent in a reflected-wave transmission. The demodulation-processing section 1302 is a unit for demodulating a received signal. The protocol control section 1303 is a unit for executing protocol control of establishing and discontinuing a reflection-wave communication in accordance with a predetermined communication protocol. A receiving section 117 employed in the wireless section 115 is a unit for receiving an unmodulated carrier and a modulated signal. The demodulation-processing section 1302 demodulates the modulated signal received by the receiving section 117 and supplies data obtained as a result of the demodulation process to the memory-access function section 1304.

On the other hand, the modulation-processing section 1301 employed in the communication control functional section modulates data read out by the memory-access function section 1304 from the flash memory 114 and supplies the result of the modulation process to the wireless section 115. The wireless section 115 detects an unmodulated carrier received from the wireless reader apparatus 102 (200) and puts the result of the modulation process in the carrier. A sending section 116 employed in the wireless section 115 sends the carrier conveying the result of the modulation process to the wireless reader apparatus 102 (200) as a reflected wave of the unmodulated carrier. The wireless section employed in the wireless reader apparatus 102 (200) receives the wave reflected by the wireless-communication-function-including memory media 110 and acquires a modulated signal from the reflected wave. The demodulation-processing section 1202 employed in the wireless reader apparatus 102 (200) demodulates the modulated signal and supplies data obtained as a result of the modulation process to the host functional section.

It is to be noted that the memory-access function section 1304 includes the address storage section 113A used for storing a most recently accessed address of a location in the flash memory 114 even though FIG. 13 does not shows the address storage section 113A itself.

The memory/communication control section 113 controls accesses to the flash memory 114 to write data into the flash memory 114 and read out data from the flash memory 114 as data to be exchanged between the data control section 1205 employed in the wireless reader apparatus 102 (200) and the memory-access function section 1304 employed in the wireless-communication-function-including memory media 110. In addition, the file control section 1206 employed in the wireless reader apparatus 102 (200) executes a logical file system control for constructing data received and sent in accordance with control executed by the data control section 1205 into file data.

Next, the file system control executed by mainly the host functional section employed in the wireless reader apparatus 102 (200) is explained. FIG. 14 is a diagram showing typical configurations of a physical storage area 700 and file data 800, which are included in the flash memory 114 employed in the wireless-communication-function-including memory media 110 for a configuration in which the flash memory 114 is assumed to be a NAND-type flash memory.

First of all, a physical address space is explained. As a physical access unit of the physical storage area 700, a 512-byte unit referred to as a page 701 is used. If a hard disk is employed in place of the flash memory 114 as a storage device, however, a sector is used as a physical access unit of the hard disk.

The physical storage area 700 consists of physical blocks, which are a collection of a plurality of pages 701. In general, a physical block is a collection of 32 pages 701. Each of the physical blocks in the physical storage area 700 has a block number used in address management. If a hard disk is employed in place of the flash memory 114 as a storage device, however, each cluster including a predetermined number of sectors has a cluster number used in address management. Thus, a cluster in a hard disk corresponds to a physical block in a flash memory.

Next, a logical address space is explained. Logically, the physical storage area 700 is divided into logical blocks, i.e., a boot logical block 71, a FAT (File Allocation Table) block 72, a directory area 73 and a data area 74. The boot logical block 71 is a logical block used for storing information relevant to the entire physical storage area 700. The FAT logical block 72 is a logical block used for storing addresses of physical blocks composing file data. For more information on this, refer to a document such as a home page at a URL of http://home.impress.co.jp/magazine/dosvpr/q-a/0007/qa0007_2.htm. The directory area 73 is a logical block used for storing directories of entire file data and the start address of each file of the file data. The data area 74 is a logical block used for storing actual block data of the file data.

First of all, the file control section 1206 employed in the host functional section making an access to file data obtains the most recently accessed address from the address storage section 113A and information on locations of the FAT logical block 72, the directory area 73 and the data area 74 from the boot logical block 71. Then, on the basis of the most recently accessed address, the start address of desired file data is acquired from the directory area 73. Subsequently, from the FAT logical block 72, addresses of blocks composing the file data are obtained. Finally, the data control section 1205 employed in the host functional section acquires the blocks composing the file data from the data area 74 and concatenates the blocks to create file data 800.

As described above, the wireless reader apparatus 102 (200) processes file data in block-data units.

FIG. 15 is a diagram showing a sequence of processes carried out by the memory-access function section 1304 employed in the wireless-communication-function-including memory media 110 to make accesses to read out file data from the flash memory 114 in block-data units at a request made by the host functional section employed in the wireless reader apparatus 102 (200).

The management section 1207 employed in the host functional section of the wireless reader apparatus 102 (200) issues a connection request 1501 to the communication control section 1204. At this request, the communication control section 1204 establishes a connection 1502 with the memory-access function section 1304 along a reflected-wave transmission line passing through the modulation-processing section 1201, the demodulation-processing section 1202, the protocol control section 1203, the wireless section employed in the wireless reader apparatus 102 (200), the wireless section 115 employed in the wireless-communication-function-including memory media 110, the modulation-processing section 1301, the demodulation-processing section 1302, the protocol control section 1303 and the memory-access function section 1304. Then, the communication control section 1204 gives the management section 1207 a connection response 1503.

The wireless reader apparatus 102 (200) needs to know in advance a relation between a logical block address and a physical block address in order to make an access to a desired file in the wireless-communication-function-including memory media 110 in page or sector units. As will be described later, each page of the flash memory 114 includes a logical address assigned to data stored in the page. Thus, the wireless reader apparatus 102 (200) can request the wireless-communication-function-including memory media 110 to provide the wireless reader apparatus 102 (200) with a logical address included in each page or each sector and, on the basis of the received logical addresses, the wireless reader apparatus 102 (200) is capable of creating an address conversion table for blocks composing every file.

Then, the management section 1207 issues a file-data read request to read out a specified file from the wireless-communication-function-including memory media 110 to the file control section 1206. For example, the file to be read out from the wireless-communication-function-including memory media 110 can be specified on the basis of a address read out from the address storage section 113A of the wireless-communication-function-including memory media 110. However, the management section 1207 may also specify the file to be read out from the wireless-communication-function-including memory media 110 by adoption of another method.

At the request, the file control section 1206 carries out an operation to read out the specified file from the wireless-communication-function-including memory media 110 on the basis of the file system control described earlier.

Accesses to the flash memory 114 employed in the wireless-communication-function-including memory media 110 are made in page units as described earlier. The wireless reader apparatus 102 (200) controls operations to read out file data from the wireless-communication-function-including memory media 110. To put it concretely, the file control section 1206 employed in the wireless reader apparatus 102 (200) acquires data from the wireless-communication-function-including memory media 110 in page units, which are the physical unit of accesses to the flash memory 114. In order to acquire data of a page from the wireless-communication-function-including memory media 110, the file control section 1206 issues a page read request 1504 to the wireless-communication-function-including memory media 110 by way of the data control section 1205. In response to the page read request 1504, the memory-access function section 1304 completing acquisition of page data in the wireless-communication-function-including memory media 110 sends the page data as a page read response 1505 to the file control section 1206 by way of the data control section 1205. The page number of the desired page can be obtained from the address conversion table mentioned above. The transaction consisting of the page read request 1504 and the page read response 1505 is carried out repeatedly for each of pages composing a desired file till all the data of the whole file is obtained.

As described above, when the wireless reader apparatus 102 (200) issues a request for data of a file, the file control section 1206 sends a request to the wireless-communication-function-including memory media 110 for every page of the file instead of sending a request to the wireless-communication-function-including memory media 110 for the whole file at one time. In response to the request made for a page of the file, the wireless-communication-function-including memory media 110 sends data read out from the flash memory 114 as data of the page to the wireless reader apparatus 102 (200) through a reflected-wave transmission line. Pieces of such data are sent from the wireless-communication-function-including memory media 110 to the wireless reader apparatus 102 (200) sequentially, for one page after another, till the data of the whole file is sent to the wireless reader apparatus 102 (200). Then, the file control section 1206 reconstructs the original file from the pieces of data, which are each received from the wireless-communication-function-including memory media 110 as a piece of data for one page. As described above, even though the file control section 1206 controls acquisition of data from the flash memory 114 of the wireless-communication-function-including memory media 110 through the reflected-wave transmission line, the control through the reflected-wave transmission line is equivalent to direct control executed by the wireless reader apparatus 102 (200) as control of operations to read out file data from the flash memory 114 and write data into the flash memory 114.

FIG. 16 is a diagram showing typical configurations of physical and logical formats of the flash memory 114 employed in the wireless-communication-function-including memory media 110.

Data of a page used as the unit of physical accesses to the flash memory 114 occupies a data area having a size of 512 bytes and an extension data area having a size of 16 bytes to give a total of 528 bytes. Thus, the size of a page buffer used in an access to the flash memory 114 is also 528 bytes.

The data area corresponds to a payload. The extension data area includes an overwrite flag with a length of 1 byte, a management flag with a length of 1 byte, a physical-block logical address with a length of 2 bytes, a format reservation area with a length of 5 bytes, an extension-data ECC (Error Correction Code) with a length of 2 bytes and a page-data ECC with a length of 3 bytes.

At a point of time a connection through a reflected-wave transmission line between the wireless reader apparatus 102 (200) and the memory media 110 including the wireless section 115 is established, allocation information in the flash memory 114 is not known. Thus, at the point of time a connection is established, the wireless reader apparatus 102 (200) makes a request for data stored in every extension data area in order to obtain the logical address of each page. The logical address of each page is then used for creating an address conversion table.

In the flash memory 114, every 32 pages having a size of 16 kilobytes form 1 block and a block number is assigned to each block. In addition, a page number is assigned to each of pages composing a block. Thus, by specifying a page number assigned to a specific page and a block number assigned to a block including the page, the page can be requested uniquely from the storage area of the flash memory 114. Furthermore, every 512 blocks having a size of 8 megabytes form a segment and a segment number is assigned to each segment.

The wireless reader apparatus 102 (200) controls physical accesses to the wireless-communication-function-including memory media 110. A physical access to the flash memory 114 is made in accordance with a control command specifying a physical-block number and a page number, which identify a page containing page data with a size of 512 bytes and extension data with a size of 16 bytes to be written into the flash memory 114 or read out from the flash memory 114 by way of the page buffer.

It is to be noted that the specification of Japanese Patent Application No. 2004-334005 already submitted by the applicant for the patent of the present invention describes a communication system in which memory media having a reflector function is requested to send data of a file in page units to the requester through a reflected-wave transmission line.

As described above, the wireless-communication-function-including memory media 110 according to this embodiment allows the wireless reader apparatus 102 (200) to read out a desired image, which has been most recently seen by the user in a playback operation carried out for example by a digital camera 101 with the wireless-communication-function-including memory media 110 mounted thereon, from the wireless-communication-function-including memory media 110 without the need for the user to specify a file of the desired image by operating the wireless reader apparatus 102 (200).

FIG. 17 is a diagram showing a sequence of control executed for transferring an image most recently seen in a playback operation carried out by the digital camera 101. The address of the image most recently seen in a playback operation is stored in the address storage section 113A of the memory/communication control section 113 employed in the wireless-communication-function-including memory media 110. The address of the image most recently seen in a playback operation is the block and page numbers of the file last read from the flash memory 114. The address of the image most recently seen in a playback operation is updated every time the user carries out a playback operation to view a file.

The control sequence shown in the figure composed of communication operations carried out among the digital camera 101, the wireless-communication-function-including memory media 110 mounted in the digital camera 101, the wireless reader apparatus 102 (200), the television set 106 such as a television set or another monitoring apparatus and the infrared remote controller 108 operated by the user.

Every time the digital camera 101 takes a picture, the digital camera 101 stores the taken picture in the flash memory 114. Later on, the user may display a desired image taken by the digital camera 101 on the television set 106.

When the user displays a desired image taken by the digital camera 101 on the television set 106, the memory/communication control section 113 employed in the wireless-communication-function-including memory media 110 stores the address of a file containing the desired image in the address storage section 113A as the address of a location used for storing the file in the flash memory 114. The address is composed of block and page numbers of the file.

In order to view an image, which is being displayed on the digital camera 101, on the screen of the television set 106, the user operates the infrared remote controller 108.

When the user operates the infrared remote controller 108 as described above, the infrared remote controller 108 sends a video switching signal to the television set 106 as an infrared ray conveying a command to switch the operating mode of the television set 106. In accordance with this command conveyed in the infrared ray, the television set 106 switches its operating mode from a mode to display a received picture to a mode to input an external video signal.

Then, the infrared remote controller 108 sends a display request signal to the wireless reader apparatus 102 (200). In accordance with this display request signal, the wireless reader apparatus 102 (200) sends a signal making a request for last read information to the wireless-communication-function-including memory media 110.

Receiving the signal making a request for last read information, the wireless-communication-function-including memory media 110 inhibits accesses made by the digital camera 101 as accesses to the flash memory 114 through the connector section 112 in order to get rid of contentions between the accesses made by the digital camera 101 as accesses to the flash memory 114 through the connector section 112 and accesses according to the transfer request signal as accesses to the flash memory 114 through the wireless section 115. Then, the memory/communication control section 113 reads out the address of the most recently read out file from the address storage section 113A and the wireless-communication-function-including memory media 110 sends the address, which is composed of block and page numbers of the file, to the wireless reader apparatus 102 (200).

On the basis of the information received from the wireless-communication-function-including memory media 110 as the address of the most recently read out file, the wireless reader apparatus 102 (200) searches an address conversion table for a most recently accessed file in the wireless-communication-function-including memory media 110. Then, the wireless reader apparatus 102 (200) makes a request for a transfer of the most recently accessed file and, at this request, the wireless-communication-function-including memory media 110 reads out JPEG image data of the file from the flash memory 114. If an access to the flash memory 114 is made at one time by the wireless reader apparatus 102 (200) as an access to a page only, as many accesses as pages composing the requested file must be made by the wireless reader apparatus 102 (200). Thus, a transaction consisting of a page read request and a page read response is carried out repeatedly as many times as pages as has been described earlier by referring to FIG. 15.

In the wireless reader apparatus 102 (200), the desired image data sent by the wireless-communication-function-including memory media 110 by wireless communication is demodulated and decoded by a JPEG decoder before being converted into an analog video signal, which is then supplied to the television set 106 through the video cable 105.

In this way, an image displayed on the display section of the digital camera 101 in a playback operation can be read out by the wireless reader apparatus 102 (200) without the need for the user to carry out an operation to select the image. Thus, the degree of convenience is improved.

It is to be noted that, in general, the reflected-wave transmission system adopts a modulation method with a relatively low bit rate. An example of such a modulation method is an ASK (Amplitude Shift Keying) modulation method. For example, the wireless-communication-function-including memory media 110 serving as the reflector is capable of carrying out a switching operation such as an operation to connect and disconnect a termination load to and from the directivity antenna in order to change the load impedance of the antenna. The load impedance of the antenna is changed to relocate 0 and 1 signals in a signal space in order to implement a BPSK modulation method with ease. However, these modulation methods have a transmission-speed problem. In order to solve this problem, a plurality of reflection lines with phase differences different from each other is provided and one of the reflection lines can be selected in accordance with the sent data to implement a phase modulation method having a higher bit rate. Examples of such a modulation method are BPSK, QPSK and 8-phase PSK modulation methods.

Figure 8:
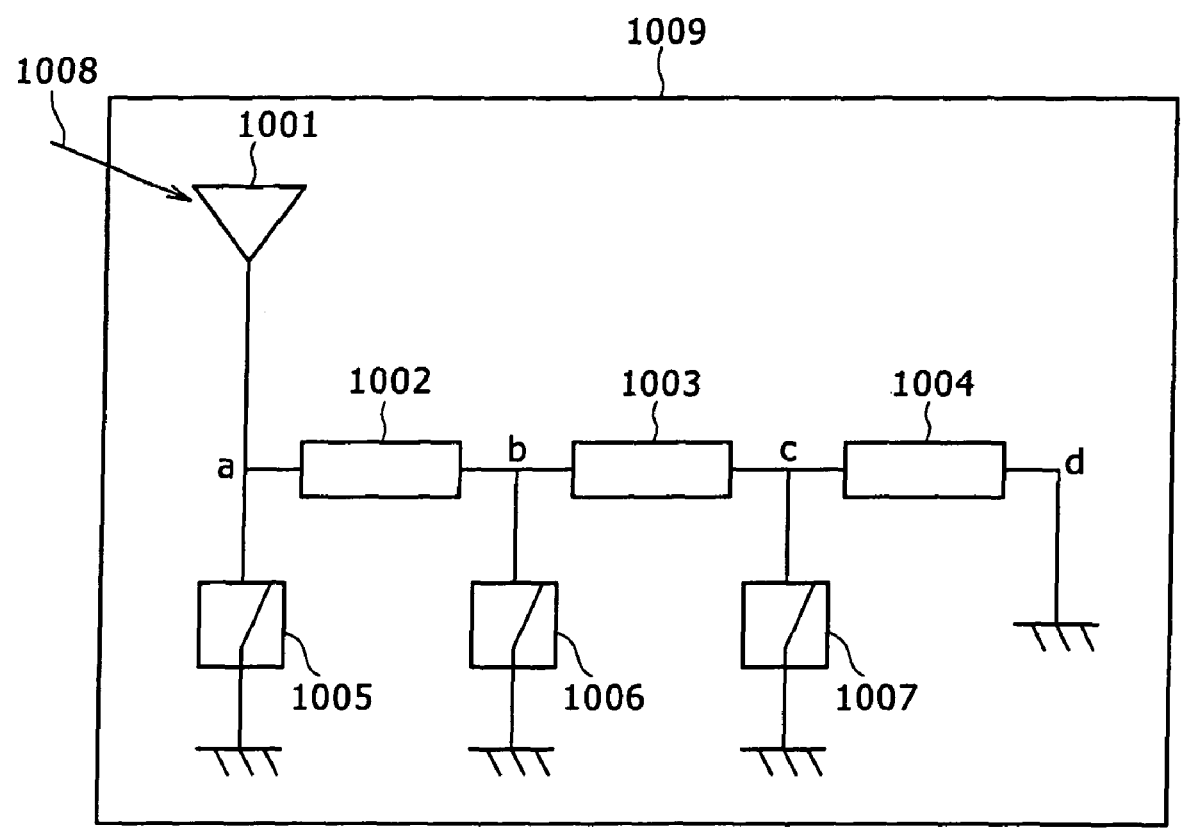
FIG. 8 is a diagram showing a typical configuration of a wireless section provided on a reflector side as a section implementing a QPSK modulation method.
Figure 9:
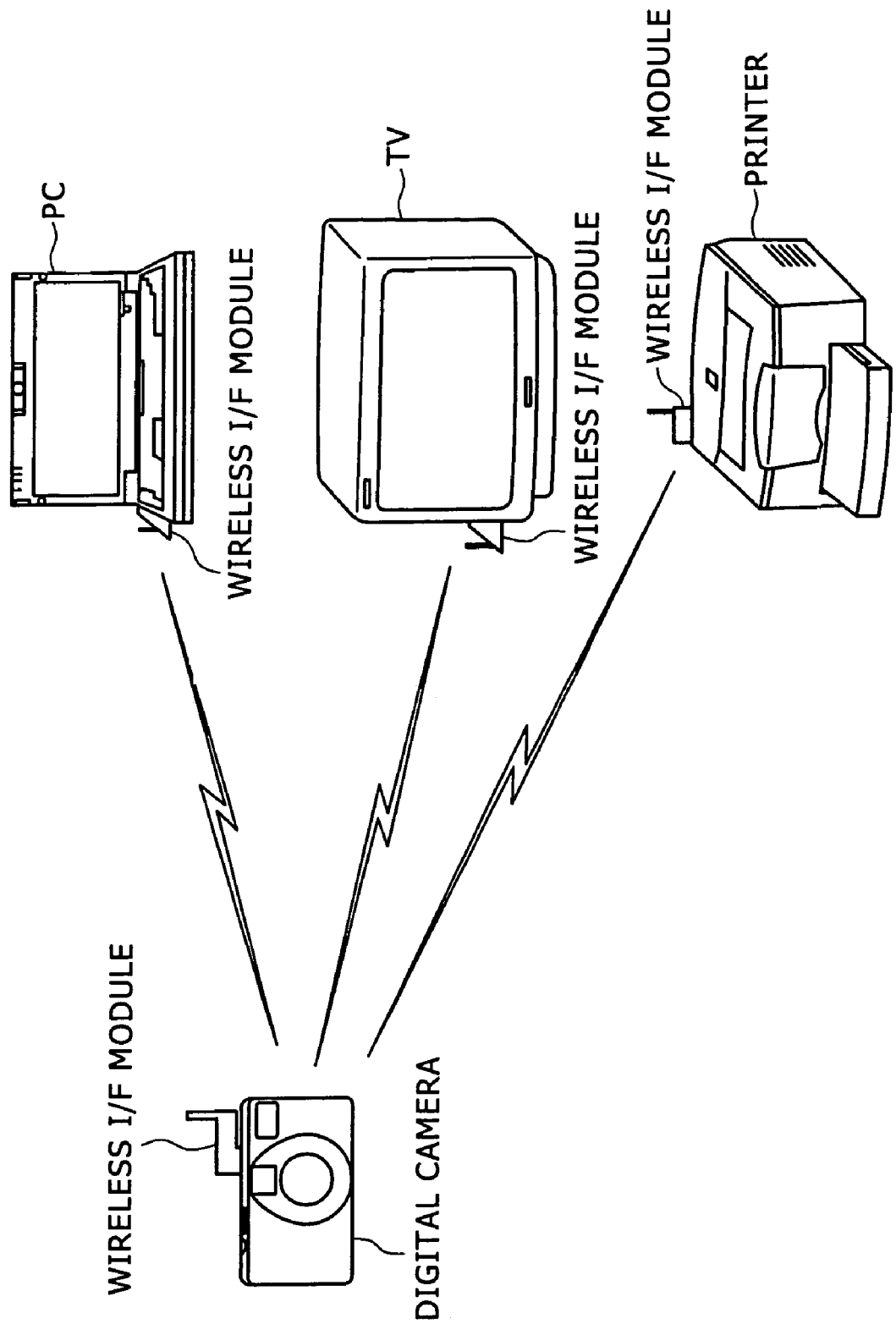
FIG. 9 is a diagram showing a typical image transmission based on wireless communication.

FIG. 8 is a diagram showing a typical configuration of a wireless section 1009 provided on an electromagnetic-wave reflector side as a section implementing the QPSK modulation method. As shown in the figure, the wireless section 1009 includes an antenna 1001 and three phase shifters 1002, 1003 and 1004 connected to each other in series. In addition, the wireless section 1009 also has a high-frequency switch 1005 connected between the ground and the junction between the antenna 1001 and the phase shifter 1002, a high-frequency switch 1006 connected between the ground and the junction between the phase shifter 1002 and the phase shifter 1003 as well as a high-frequency switch 1007 connected between the ground and the junction between the phase shifter 1003 and the phase shifter 1004.

The phase shifters 1002, 1003 and 1004 are each a transmission line such as a stripe line for converting the wavelength λ of a received wave 1008 into λ/8. Taking the dielectric constant ∈ of the substrate into consideration, the length L of the stripe line is expressed by the following equation:

$$L = \lambda / 8 \sqrt{\in_{eff}} \tag{1}$$

where notation $\in_{eff}$ denotes the effective dielectric constant of the substrate.

On the other hand, the transmission speed S of the signal propagating through the substrate is expressed by the following equation:

$$S = C_0 / \sqrt{\in_{eff}} \tag{2}$$

where notation $C_o$ denotes the velocity of light.

The time required by a received signal 1008 to pass through a phase shifter is expressed by the following equation:

$$L/S = \lambda / C_0 = T/8 \tag{3}$$

where notation T denotes the period of the received wave.

After the received wave 1008 passes through the phase shifters 1002, 1003 and 1004, the phase of the received wave 1008 is shifted by 360/T×T/8 to result in a phase difference of 45 degrees in a one-way propagation through each of the phase shifters 1002, 1003 and 1004, or 90 degrees in a reciprocating propagation through each of the phase shifters 1002, 1003 and 1004. The series circuit consisting of the phase shifters 1002, 1003 and 1004 is connected to the antenna 1001. Thus, by turning on or off any of the high-frequency switches 1005, 1006 and 1007, shorted-circuit points a, b and c can be obtained at the turned-on phase shifters 1002, 1003 and 1004. Since the received wave 1008 is reflected at a short-circuited point, by turning on or off any of the high-frequency switches 1005, 1006 and 1007, it is possible to generate three differences in phase between the received wave 1008 reflected after completing no propagation through the phase shifters 1002, 1003 and 1004 and a signal reflected after completing a reciprocating propagation through any of the phase shifters 1002, 1003 and 1004. Another difference in phase is a phase difference of 0 between the received wave 1008 itself and the received wave 1008 reflected after completing no propagation.

To put it concretely, if only the high-frequency switch 1005 is turned on, the received wave 1008 is reflected at the shorted-circuit point a shown in the figure. If only the high-frequency switch 1006 is turned on, the received wave 1008 is reflected at the shorted-circuit point b shown in the figure. The difference in phase between the received wave 1008 reflected at the shorted-circuit point a and the received wave 1008 reflected at the shorted-circuit point b after passing through the phase shifter 1002 is 90 degrees. If only the high-frequency switch 1007 is turned on, the received wave 1008 is reflected at the shorted-circuit point c shown in the figure. The difference in phase between the received wave 1008 reflected at the shorted-circuit point a and the received wave 1008 reflected at the shorted-circuit point c after passing through the phase shifters 1002 and 1003 is 180 degrees. If all the phase shifters 1005 to 1007 are turned off, the received wave 1008 is reflected at the shorted-circuit point d shown in the figure. The difference in phase between the received wave 1008 reflected at the shorted-circuit point a and the received wave 1008 reflected at the shorted-circuit point d after passing through the phase shifters 1002, 1003 and 1004 is 270 degrees. As a result, by selectively turning on only the high-frequency switch 1005, 1006 or 1007 as described above, four different reflected waves with phases shifted from each other by 90 degrees can be obtained.

The QPSK modulation method is adopted in a data transmission by delimiting the sent data into portions each consisting of 2 bits and assigning a phase to each of the portions. A phase is assigned to a portion as a combination of the values 0 and 1 set at the 2 bits composing the portion. To put it concretely, sent data is segmented into 2-bit portions and, in order to reflect a 2-bit portion of 00, only the high-frequency switch 1005 is turned on. In order to reflect a 2-bit portion of 01, only the high-frequency switch 1006 is turned on. In order to reflect a 2-bit portion of 11, only the high-frequency switch 1007 is turned on. In order to reflect a 2-bit portion of 10, all the phase shifters 1005 to 1007 are turned off.

By assigning values to 2-bit portions as described above, four different reflected waves with phases shifted from each other by 90 degrees can be obtained or four points, i.e., the (0,0), (0, 1), (1, 0) and (1, 1) points can be placed in a signal space. Thus, it is possible to generate a reflected signal completing the QPSK modulation process.

For example, the specification of Japanese Patent Application No. 2003-352223 already submitted by the applicant for the patent of the present invention describes a communication system adopting the back scatter method based on the QPSK modulation technique.

The present invention has been described above in detail by referring to preferred embodiments. It is obvious, however, that a person skilled in the art is capable of changing the embodiments and creating substitutes for the embodiments within a range not departing from the essentials of the present invention.

In accordance with the present invention, an image pick-up apparatus such as a digital camera, in which a memory card used for storing a taken picture has been mounted, does not need driver software to be used for controlling an operation to send the taken picture to an external apparatus such as a PC, a television set or a printer by wireless communication.

In addition, by adoption of a reflected-wave transmission technique as the method of sending data such as a taken picture by wireless communication, reduction of the power consumption can be implemented. Among other things, in a communication configuration, in which a ratio of transmission between apparatus separated from each other by distances limited to relatively short distances represents occupation of most of the entire communication, reduction of the power consumption can be implemented. For example, transmissions with a power consumption several orders of magnitude lower than the wireless LAN can be implemented in mobile apparatus. Thus, the life of a battery employed in the mobile apparatus can be prolonged substantially.

On top of that, by adoption of a reflected-wave transmission technique as the method of sending data such as a taken picture by wireless communication, the wireless transmission module employed in the mobile apparatus serving as a data sender can be implemented at a low cost in comparison with a wireless LAN. In addition, the wireless transmission module employed in the mobile apparatus is not a wireless-station target in accordance with the electromagnetic-wave law. Thus, a certificate proving product suitability is not required.

In a word, the present invention has been explained through preferred embodiments and, thus, the scope of the present invention should not be limited to what is described in this specification. The essentials of the present invention are determined only by the ranges of claims appended to this specification.

In addition, it should be understood by those skilled in the art that a variety of modifications, combinations, sub-combinations and alterations may occur in dependence on design requirements and other factors insofar as they are within the scope of the appended claims or the equivalents thereof.

The invention claimed is:

1. A memory card mountable onto an external apparatus, the memory card comprising:
    wire communication means freely mountable onto an external apparatus and freely dismountable from the external apparatus;
    a memory for storing external apparatus data received from the external apparatus through the wire communication means;
    wireless communication means for carrying out communication operations with an external wireless apparatus through a wireless transmission line;
    memory/communication control means for controlling operations to access said memory by said external apparatus by way of said wire communication means and by said external wireless apparatus by way of said wireless communication means and for controlling wireless communication operations carried out by said wireless communication means,
    wherein said memory/communication control means is adapted to allow said wireless communication means and wire communication means to request an operation to read out data from said memory, and allow said wire communication means but not said wireless communication means to request an operation to write data into said memory;
    address storage means for storing an address in said memory indicating a location most recently accessed through said wire communication means,
    wherein said address in said address storage means being acquirable by said external wireless apparatus to enable said external wireless apparatus to identify from said address a file most recently accessed through said wireless communication means, and to issue a request for that file to said memory/communication control means via said wireless communication means;
    wherein said memory/communication control means is adapted to control operations to access said memory in accordance with a state of connection of said wireless communication means;
    wherein said external apparatus is an image pick-up apparatus for taking an image;
    said memory card is connected to said image pick-up apparatus through said wire communication means;
    said image taken by said image pick-up apparatus is stored in said memory by way of said wire communication means in accordance with control executed by said memory/communication control means; and
    when a request for a desired image stored in said memory is received from an external wireless apparatus through said wireless communication means, in response to said request, data of the image is read out from said memory and transferred to said external wireless apparatus making said request by way of said wireless communication means.

2. The memory card according to claim 1, wherein said wireless communication means is adapted to carry out communication operations to send data read out from said memory through said wireless transmission line to said external wireless apparatus independently of the external apparatus connected to said wire communication means.

3. The memory card according to claim 1, wherein said memory/communication control means is adapted to receive power from said external apparatus in which said memory card has been mounted by way of said wire communication means.

4. The memory card according to claim 1, wherein said memory/communication control means is adapted to allow only one access to said memory to be made at one time in an operation carried out by either said wire communication means or said wireless communication means.

5. The memory card according to claim 1, wherein, while said wireless communication means is carrying out a wireless communication operation to access said memory, said memory/communication control means is adapted to prohibit an access made by said wire communication means as an access to said memory.

6. The memory card according to claim 1, wherein:
said memory is used for storing more than one file; and
when an external wireless apparatus requests a file stored in said memory or requests information on files stored in said memory through said wireless communication means, in response to said request, said memory/communication control means is adapted to send said requested file or said requested information on said files to the external wireless apparatus by way of said wireless communication means.

7. The memory card according to claim 1, wherein, in response to said request received from said external wireless apparatus through said wireless communication means for said address indicating a most recently accessed location in said memory, said memory/communication control means is adapted to send said address to the external wireless apparatus.

8. The memory card according to claim 1, wherein said wireless communication means is adapted to carry out an operation to send data read out from said memory to said external wireless apparatus through a wireless communication line without relying on said external apparatus connected to said wire communication means.

9. A memory-card control method, comprising:
controlling a memory card, wherein the memory card comprises: a wire communication means freely mountable onto an external apparatus and freely dismountable from said external apparatus, a memory for storing external apparatus data received from said external apparatus through said wire communication means, a wireless communication means for carrying out communications with an external wireless apparatus through a wireless transmission line, and an address storage means for storing an address indicating a most recently accessed location in said memory, and wherein controlling said memory card comprises:
accessing said memory by way of the wire communication means and said wireless communication means;
controlling wireless communications operations carried out by the wireless communication means, including allowing the wireless communication means and wire communication means to request an operation to read out data from said memory, and allowing said wire communication means but not said wireless communication means to request an operation to write data into said memory;
acquiring, from said address storage means employed by said memory card, said address indicating a most recently accessed location in said memory;
identifying a most recently accessed file based on said acquired address;
requesting said memory card through and wireless communication means to send data including said identified file to said external wireless apparatus;
wherein the step of controlling wireless communication operations carried out by the wireless communication means includes controlling operations to access the memory in accordance with the state of connection of the wireless communication means;
wherein the external apparatus is an image pick-up apparatus for taking an image;
the memory card is connected to the image pick-up apparatus through the wire communication means;
the step of controlling operations to access the memory includes storing an image taken by the image pick-up apparatus in the memory by way of the wire communication means; and
in the step of controlling wireless communication operations carried out by the wireless communication means, when a request for a desired image stored in the memory is received from an external wireless apparatus through the wireless communication means, in response to the request, data of the image is read out from the memory and transferred to the external wireless apparatus making the request by way of the wireless communication means.

10. The memory-card control method according to claim 9, wherein, in the step of controlling wireless communication operations carried out by the wireless communication means, the wireless communication means carries out communication operations to send data read out from the memory through the wireless transmission line to the external wireless apparatus independently of the external apparatus connected to the wire communication means.

11. The memory-card control method according to claim 9, wherein the step of controlling wireless communication operations carried out by the wireless communication means includes allowing only one access to the memory at one time in an operation carried out either by the wire communication means or the wireless communication means.

12. The memory-card control method according to claim 9, wherein the step of controlling wireless communication operations carried out by the wireless communication means includes not allowing the wire communication means to access the memory while the wireless communication means is carrying out a wireless communication operation to access the memory.

13. The memory-card control method according to claim 9, wherein the memory is used for storing more than one file, and
in the step of controlling wireless communication operations carried out by the wireless communication means when an external wireless apparatus requests a file stored in the memory or requests information on files stored in the memory through the wireless communication means, in response to the request, the requested file or the requested information on the files is sent to the external wireless apparatus by way of said wireless communication means.

14. A non-transitory computer program readable by a computer, said program being executable by said computer to execute an access control method, said method comprising:
controlling a memory card, wherein said memory card comprises: a wire communication means freely mountable onto an external apparatus and freely dismountable from the external apparatus, a memory for storing external apparatus data received from said external apparatus through said wire communication means, a wireless communication means for carrying out communications with an external wireless apparatus through a wireless transmission line, and an address storage means for storing an address indicating a most recently accessed location in said memory and accessible from said external wireless apparatus through said wireless communication means, and wherein controlling the memory card comprises:

accessing the memory by way of said wire communication means and said wireless communication means, controlling wireless communications operations carried out by the wireless communication means, including allowing the wireless communication means and wire communication means to request an operation to read out data from said memory, and allowing said wire communication means but not said wireless communication means to request an operation to write data into said memory;

acquiring, from said address storage means in said memory card, said address indicating a most recently accessed location in said memory;

identifying a most recently accessed file based on the acquired address; and requesting the memory card through the communication means to send data composing the identified file to the external wireless apparatus;

wherein the step of controlling wireless communication operations carried out by the wireless communication means includes controlling operations to access the memory in accordance with the state of connection of the wireless communication means;

wherein the external apparatus is an image pick-up apparatus for taking an image;

the memory card is connected to the image pick-up apparatus through the wire communication means;

the step of controlling operations to access the memory includes storing an image taken by the image pick-up apparatus in the memory by way of the wire communication means; and in the step of controlling wireless communication operations carried out by the wireless communication means, when a request for a desired image stored in the memory is received from an external wireless apparatus through the wireless communication means, in response to the request, data of the image is read out from the memory and transferred to the external wireless apparatus making the request by way of the wireless communication means.

15. A non-transitory computer program readable by a computer, the program being executable by the computer to execute memory-card control method, the method comprising:

controlling a memory card, wherein said memory card comprises: a wire communication means freely mountable onto an external apparatus and freely dismountable from the external apparatus, a memory for storing external apparatus data received from said external apparatus through said wire communication means, and a wireless communication means for carrying out communications with an external wireless apparatus through a wireless transmission line, and wherein controlling the memory card comprises:

accessing said memory by way of said wire communication means and said wireless communication means, controlling wireless communications operations carried out by the wireless communication means, including allowing the wireless communication means and wire communication means to request an operation to read out data from said memory, and allowing said wire communication means but not said wireless communication means to request an operation to write data into said memory;

acquiring, from an address storage means employed by said memory card, an address indicating a most recently accessed location in said memory;

identifying a most recently accessed file based on said acquired address;

requesting said memory card through said wireless communication means to send data including said identified file to said external wireless apparatus, wherein the step of controlling wireless communication operations carried out by the wireless communication means includes controlling operations to access the memory in accordance with the state of connection of the wireless communication means;

wherein the external apparatus is an image pick-up apparatus for taking an image;

the memory card is connected to the image pick-up apparatus through the wire communication means;

the step of controlling operations to access the memory includes storing an image taken by the image pick-up apparatus in the memory by way of the wire communication means; and in the step of controlling wireless communication operations carried out by the wireless communication means, when a request for a desired image stored in the memory is received from an external wireless apparatus through the wireless communication means, in response to the request, data of the image is read out from the memory and transferred to the external wireless apparatus making the request by way of the wireless communication means.

* * * * *